United States Patent
Boucachard et al.

(10) Patent No.: US 8,326,994 B2
(45) Date of Patent: Dec. 4, 2012

(54) METHOD FOR SETTING UP A COMMUNICATIONS PATH IN AN EXTENDED COMMUNICATIONS NETWORK, COMPUTER-READABLE STORAGE MEDIUM AND CORRESPONDING TUNNEL END-POINTS

(75) Inventors: Philippe Boucachard, Rennes (FR); Tristan Halna Du Fretay, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 12/418,405

(22) Filed: Apr. 3, 2009

(65) Prior Publication Data
US 2009/0259755 A1  Oct. 15, 2009

(30) Foreign Application Priority Data
Apr. 9, 2008  (FR) ...................... 08 52389

(51) Int. Cl.
  *G06F 15/16* (2006.01)
(52) U.S. Cl. .................. 709/227; 709/203; 709/206
(58) Field of Classification Search .............. 709/206, 709/227, 203, 217, 219, 224
See application file for complete search history.

(56) References Cited

U.S. PATENT DOCUMENTS

| | | | |
|---|---|---|---|
| 7,808,984 B2* | 10/2010 | Tomich et al. ............. | 370/389 |
| 7,940,694 B2* | 5/2011 | Pusateri ................. | 370/254 |
| 2004/0190532 A1* | 9/2004 | Oguchi et al. ............. | 370/399 |
| 2006/0285498 A1* | 12/2006 | Wakumoto et al. .......... | 370/248 |

OTHER PUBLICATIONS

International Telecommunication Union, "Information Technology—Open Systems Interconnection—Procedures for the operation of OSI Registration Authorities: Generation and registration of Universally Unique Identifiers (UUIDs) and their use as ASN.1 object identifier components", 2004, ITU-T Recommendation X.667|ISO/IEC 9834-8:2005.

* cited by examiner

*Primary Examiner* — Yves Dalencourt
*Assistant Examiner* — El Hadji Sall
(74) *Attorney, Agent, or Firm* — Fitzpatrick, Cella, Harper & Scinto

(57) ABSTRACT

A method is proposed for setting up a communications path between a first communications sub-network and a second communications sub-network by means of an intermediate communications sub-network in an extended communications network. More specifically, to set up the communications path, said intermediate sub-network comprises at least two tunnel end-points and an input tunnel end-point of said intermediate sub-network which performs the following steps of: receiving, from a tunnel of said input tunnel end-point, a relay activation message to set up said path, said message referring to a local relay involving said input tunnel end-point; determining, from said relay activation message, an output tunnel end-point of said intermediate sub-network involved in the local relay; activating the local relay for a part of said path between said first sub-network and said second sub-network transmitting the relay activation message to said output tunnel end-point.

16 Claims, 16 Drawing Sheets

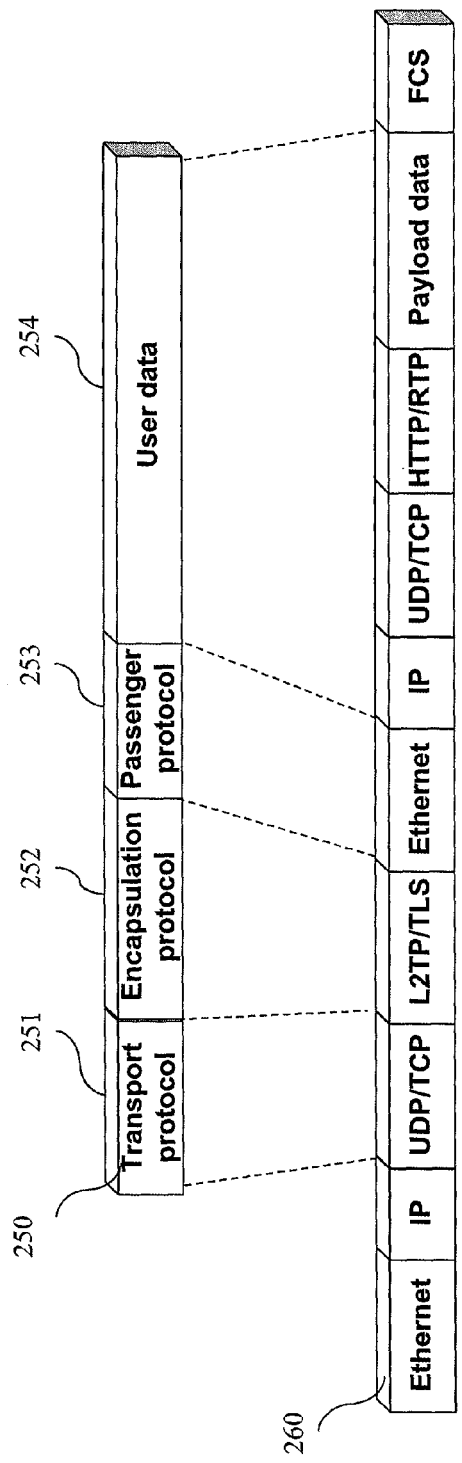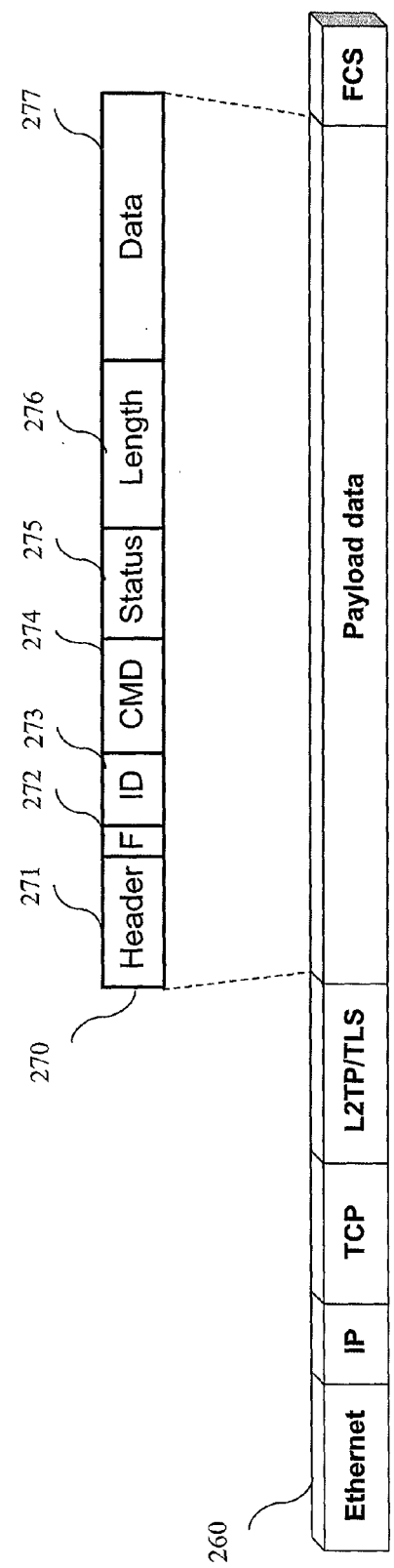

METHOD FOR SETTING UP A COMMUNICATIONS PATH IN AN EXTENDED COMMUNICATIONS NETWORK, COMPUTER-READABLE STORAGE MEDIUM AND CORRESPONDING TUNNEL END-POINTS

1. FIELD OF THE INVENTION

The field of the invention is that of communications networks.

More specifically, the invention pertains to a technique for the constitution, within a community, of an extended communications network formed by a set of local area networks, the interconnection of these local area networks being set up for each of these local area networks by means of tunnels and relay mechanisms between tunnels, these mechanisms being activated by preventing the formation of data path loops within the network community thus created.

2. BACKGROUND OF THE DISCLOSURE

The technology of virtual private networks (VPNs) is used in a known way for remote communication with the apparatuses of a local area network (LAN) using a stand-alone device, and also enables two LANs to be connected up together so that their apparatuses can communicate transparently as if they were connected to the same LAN.

The implementation of VPNs can be used, for example, for real-time, secured communication between individuals sharing a same field of interest while at the same time using the internet infrastructure which has low reliability but is inexpensive.

Consider a set of houses or office buildings communicating with one another and forming a community of geographically distant sites, each site being equipped with a LAN to which Ethernet terminals are connected. These local area networks are formed by a set of Ethernet segments that may be connected to one another by local bridges. Each member site of a community is connected to one or more other remote sites which are members of this same community by means of a WAN (Wide Area Network) or MAN (Metropolitan Area Network) type network to which it is connected by a specific interface compliant with the specifications of the protocols used on this WAN or MAN network.

Conventionally, LANs belonging to distinct remote sites are dynamically interconnected to one another for the execution of communications requests coming from applications that are being executed on the Ethernet terminals. These local networks then communicate by means of remote bridges.

The remote bridges are firstly connected to a LAN via a level 2 interface and also connected to one another via level 2 tunnels, i.e. the link layer level (level two according to the OSI model sub-dividing communications protocols into seven layers) which communicate via WAN or MAN type networks mentioned here above. Each of these level 2 tunnels is set up between two apparatuses called tunnel end-points (or TEPs) each connected to one of the two directly interconnected LANs.

The tunnel end-points implement the remote-bridge function and the function of tunneling link-level messages such as Ethernet frames sent out by Ethernet terminals connected to these local area networks. The term "tunneling" is understood to mean a particular encapsulation or packaging of data, creating these tunnels supported by WAN or MAN type intermediate networks which may be IP networks.

It is important to note that, in the context of this invention, the meshing constituted by all the tunnels set up within a community between a set of directly interconnected distant sites is generally not a complete meshing (i.e., in principle, there is no tunnel between a given local area network and each of the other local area networks of the community). Despite this partial mesh between the sites, each site of a community can communicate with each other site of the community thanks to a relay function supported by each tunnel end-point.

This relay function for a tunnel end-point sets up a connection between two level 2 tunnels and enables indirect communication between two sites of a community that are not directly interconnected by a tunnel.

The implementation of this relay function therefore requires the use of three tunnel end-point apparatuses in order to enable communication between applications executed on two Ethernet terminals respectively connected to a first and second LAN network representing two remote sites not directly connected by a tunnel. These communications ensured by means of a relay function support both peer-to-peer type and client-server type applications architectures.

These three tunnel end-points can be sub-divided as follows: the two LAN tunnel end-points to which the Ethernet terminals supporting the applications (or communications programs) are connected, as well as a third intermediate tunnel end-point ensuring said relay function. This third tunnel end-point is directly connected via two level two tunnels to the two above-mentioned remote tunnel end-points.

In such a partially meshed network of a community of LANs interconnected by level 2 tunnels, it is possible to discover all the direct paths (without relay function) and indirect paths (thanks to the relay function fulfilled by certain tunnel end-points) between any two remote LANs. The term "path" is understood to mean a set of network infrastructure elements such as interconnection devices and links used to obtain the transfer from a first sub-network (or LAN) to a second sub-network (or LAN) and from the second sub-network (or LAN) to the first sub-network (or LAN). This is done while preventing the formation of data paths loops which would make the global community network less efficient, or even inoperative, by means of well-known algorithms for eliminating data path loops.

A first known algorithm for eliminating data path loops consists in deactivating the relay function of certain tunnel end-points in which the initial state of the relay function is active by default. This processing can be used to find out which relay functions of certain tunnel end-points are to be activated in order to enable communications between all the possible couples within the community, a couple being formed by a source tunnel end-point and a destination tunnel end-point.

However, one problem will arise in the case of a topology of a network system comprising one or more sites having a LAN interfaced with MAN or WAN networks by means of at least two tunnel end-points, also called multi-TEP LANs. Indeed, the process of tracing the global topology of the network will identify those sites having a multi-TEP LAN with at least two tunnel end-points in a manner identical to a set of two LANs interconnected by a tunnel set up between two tunnel end-points of two remote sites.

The execution of the algorithm by the deactivation of certain relays will then leave these multi-TEP LANs in a state in which the traffic entering via the tunnel of one tunnel end-point will be transmitted locally on the multi-TEP LAN to the other tunnel end-points and therefore retransmitted (relayed) via their respective tunnels. For, these other tunnel end-points are unable to distinguish traffic emitted locally by an Ethernet terminal attached to the multi-TEP LAN from traffic coming from an Ethernet terminal attached to a remote LAN by another tunnel end-point. Thus, data path loops will persist.

The US patent document 2006/0285498 (Hewlett Packard) implements an algorithm of this kind for eliminating data path loops by the deactivation of certain relays. This document furthermore proposes a method according to which a switch can discover a broadcasting path from the switch to a set of switches connected by means of a path trace-route message called a "broadcast trace route" generated from a first switch. However, this method cannot be used to take account of a community with a network configuration including multi-TEP LANs or a LAN having several connections to the MAN network or to the WAN network set up via several tunnel end-points connected to the same local LAN. Thus, data path loops will persist.

A second well known loop elimination algorithm relates to the STP (Spanning Tree Protocol) algorithm. The local bridges according to the IEEE 802.1D standard and the remote bridges according to the IEEE 802.1G standard resolve the problem of detection and elimination of the logic loops in a network whose segments are connected to one another by respectively local and remote bridges via the use of this STP algorithm. This entirely distributed algorithm is executed in parallel on each of the bridges. It can be defined as a dialogue protocol between all these bridges used to eliminate redundant links and retain only the links that are more interesting (having faster communications lines, lower-cost communications lines etc). When there are numerous paths, the algorithm chooses the most efficient one of them and closes the other paths. If the path is faulty, it automatically reconfigures the network so that another path becomes active in order to continue the operations.

As the English name suggests, this STP algorithm will set up a spanning tree in a meshed network and invalidate all the links that do not form part of this network.

However, for an efficient design of the physical topology of a meshed network, it is necessary to preserve a redundancy of physical paths if one of the links should go out of operation. This is why there is a need for a "Spanning Tree" (IEEE 802.1D) type algorithm setting up the unicity of the logic path between two nodes of the network but with a possibility of updating when one of the physical links, supported by a path, has just become unusable.

Another algorithm, or called RSTP (Rapid Spanning Tree Protocol) algorithm, is a development of the STP algorithm. It produces a faster convergence of the algorithm with a change in topology, for example when there is a failure of a physical link or the creation of a new physical link or yet again the insertion of a new bridge into the network. The IEEE 802.1D-2004 standard now includes RSTP and makes STP obsolete. However, if RSTP is applied in the context of the invention, this RSTP algorithm will process each of the tunnel end-points as a remote bridge and, therefore, for certain tunnel end-points, it will block the input traffic and output traffic on a tunnel end-point of a network LAN A. This makes this tunnel port unusable for direct communications (without relay functions) from another network LAN B directly interconnected to this LAN A via a tunnel. The communications between the two networks LAN A and LAN B will then have to go on an indirect path via a tunnel end-point whose relay function is activated, thus using a less efficient and less reliable path.

Finally, another algorithm called an MSTP (Multiple Spanning Tree Protocol) specified in IEEE 802.1s and then merged with IEEE 802.1Q-2003 defines an extension to the RSTP protocol to increase the utility of the concept of virtual local area networks (VLANs). This MSTP configures a network spanning tree specific to each VLAN and blocks a set of redundant links independently for each tree corresponding to a VLAN.

As described here above, the STP algorithm and its variants (RSTP, MSTP) no longer authorize input and output traffic pertaining to tunnel bridges that do not belong to the best path computed by the algorithm for a communication between a network LAN A and a network LAN B. This therefore makes these tunnel ports unusable for direct communications (without relays) from another network LAN C directly interconnected with the LAN A via a tunnel. Although LAN A and LAN C are directly interconnected by a tunnel, communications between these networks would then have to pass via a tunnel end-point whose relay function is activated, thus constituting a less efficient and less reliable path.

3. GOALS OF THE INVENTION

The invention, in at least one embodiment, is aimed especially at overcoming these different drawbacks of the prior art.

More specifically, it is a goal of at least one embodiment of the invention to provide a technique to trace a set of possible paths in order to set up communications between LANs of a community connected by communications tunnels and to set up these paths by activation of relays between different tunnels, this goal being achieved in preventing the constitution of data path loops limiting the performance of the extended communications network.

In at least one embodiment of the invention, it is a goal to provide a technique for using tunnels that are not involved in relays needed to set up communications paths in the community, for point-to-point communications between the LANs situated at the ends of these tunnels.

It is another aim of at least one embodiment of the invention to provide a technique of this kind that is adapted to implementation in tunnel end-points with the purpose of being completely transparent for the source and destination apparatuses.

It is another aim of at least one embodiment of the invention to provide a technique of this kind that is suited to being implemented in tunnel end-points transparently for a manager tunnel end-point that has initiated the search for the paths.

4. SUMMARY OF THE INVENTION

In one particular embodiment of the invention, a method is proposed for setting up a communications path between a first communications sub-network and a second communications sub-network by means of an intermediate sub-network, in an extended communications network, said extended communications network comprising a plurality of sub-networks, each sub-network comprising at least one tunnel end-point to enable the interconnection of said sub-network with at least one other sub-network of said plurality of sub-networks by means of at least one communications tunnel via a backbone network.

According to the invention, said method is remarkable in that said intermediate sub-network comprises at least two tunnel end-points and in that an input tunnel end-point of said intermediate sub-network performs the following steps:

receiving, from a tunnel of said input tunnel end-point, a relay activation message to set up said path, said message referring to a local relay involving said input tunnel end-point;

determining, from said relay activation message, an output tunnel end-point of said intermediate sub-network involved in the local relay;

activating the local relay for a part of said path between said first sub-network and said second sub-network;

transmitting the relay activation message to said output tunnel end-point.

Thus, the invention relies on a wholly novel and inventive approach to the activation of the relay function of the sub-network (also called a LAN) comprising at least two tunnel end-points to set up a communications path between two sub-networks of a community of sub-networks constituting an extended network.

It may be recalled here that the term "path" refers to a set of network infrastructure elements such as interconnection devices and goods, enabling the transfer of the documents from a first sub-network or LAN to a second sub-network or LAN and from the second sub-network (or LAN) to the first sub-network (or LAN).

In the context of the invention, it is sought to freely let through the stream of frames between the tunnel of a tunnel end-point of a multi-TEP LAN and the terminals attached to this LAN while retaining the possibility of selectively blocking the traffic of frames between the tunnels of the tunnel end-points of a same LAN by activation or deactivation of a relay function of these tunnel end-points connected to the LAN network.

Thus, during the selective activation of the relay function of certain tunnel end-points, the invention avoids the creation of data path loops (also called redundant paths) for any pair whatsoever of Ethernet terminals each connected to a remote sub-network and communicating together within the community.

Advantageously, said determining step is performed on the basis of a relay descriptor, contained in the relay activation message, said descriptor comprising a tunnel identifier associated with said local relay and in correspondence with the input tunnel end-point, said tunnel identifier identifying a tunnel distinct from the tunnel or tunnels of said input tunnel end-point.

Each multi-TEP LAN has a corresponding "unique" tunnel end-point identified in the relay activation message by means of the identifier of the input tunnel end-point, a global port number of the input tunnel end-point and a global number of an output port of the tunnel end-point transmitting the relay activation message to a remote site. The correspondence between the first input tunnel end-point and the second output tunnel end-point is advantageously obtained by the notion of the global number of output port.

Advantageously, said method preliminarily comprises the following steps:

receiving a global trace-route message for tracing communication paths within said extended communications network;

adding a relay descriptor referring to the input tunnel end-point to the global trace-route message;

transmitting the modified global trace-route message to at least one other tunnel end-point of said intermediate sub-network.

Thus, at each relay encountered for a given path, the trace-route message is enriched by a relay descriptor consisting of the identifier of the input tunnel end-point. The descriptor will then be complemented by the output tunnel end-point with an output tunnel port identifier. The output tunnel end-point which is involved in the relay can be identified by means of the output tunnel identifier. The different descriptors thus entered enable the insertion, into the relay activation message, of all the relays to be activated in order to route a data frame between a first LAN and a second LAN. Furthermore, the descriptor associated with a relay on the multi-TEP LAN thus has the same format as a descriptor associated with a relay on a single-TEP LAN. This provides for compatibility with a manager tunnel end-point and with single-TEP LAN tunnel end-points, that do not know the multi-TEP LAN.

Advantageously, the relay descriptor further comprises an identifier of the tunnel of the input tunnel end-point via which the global trace-route message has been received by said input tunnel end-point.

The descriptor is thus enriched, enabling the building of the response messages to the global trace-route message which are able to take a path in the direction reverse to the one used by the global trace-route message.

In an astute aspect of the invention, the relay activating step performed by the input tunnel end-point enables the path to be set up for communications in the direction going from the second sub-network to the first sub-network.

The input tunnel end-point activates the relay for a part of the path going from the second sub-network. The frames of this second sub-network will be transmitted on the multi-TEP LAN by the output tunnel end-point to the first sub-network. This makes it possible not to take account, in the application of the activated relay, of the source addresses of the frames arriving by a tunnel to the tunnel end-point and to routinely transmit them to the local LAN (i.e. the multi-TEP LAN). The output tunnel end-point is then responsible for distinguishing the frames to be relayed to its tunnels from the frames intended solely for the local LAN (i.e. the multi-TEP LAN).

In an advantageous characteristic, said relay activating step includes a step of stopping a filtering of the data frames coming from said second sub-network by elimination of an address associated with said output tunnel end-point in a frame filtering table of the input tunnel end-point.

Thus, the relays can be activated by simple updating of the bridge device routing tables which constitute the tunnel end-points. The filtering operations on the frame source address complement the similar filtering mechanisms applied to frame source addresses already present in a bridge device. This especially facilitates the routing by frame relays coming from the second sub-network.

Advantageously, said filtering is performed on source address field of said data frames, said field corresponding to a virtual address which is allocated by the tunnel end-point of said intermediate network having received said data frames and which represents the tunnel via which said frames have been received.

Thus it is possible in a simple way to distinguish the input tunnel from the frames retransmitted on the multi-TEP LAN and thus perform the filtering and routing of these frames in a simple and efficient way.

The invention also relates to a method for setting up a communications path between a first communications sub-network and second communications sub-network by means of an intermediate sub-network, in an extended communications network, said extended communications network comprising a plurality of sub-networks, each sub-network comprising at least one tunnel end-point for the interconnection of said sub-network to at least one other sub-network of said plurality of sub-networks by means of at least one communications tunnel via a backbone network.

Remarkably, said intermediate sub-network has at least two tunnel end-points, and an output tunnel end-point of said intermediate sub-network performs the following steps:

receiving, from an input tunnel end-point of said intermediate sub-network, a relay activation message for setting up said path, said message referring to a local relay involving said input tunnel end-point and said output tunnel end-point;

activating the local relay for a second part of said path between said first sub-network and said second sub-network, complementary to a first part of said path for which said local relay has been activated by said input tunnel end-point.

The activation of a relay is done for the part of the path as a complement to what was done by the input tunnel end-point. The two tunnel end-points, namely the input tunnel end-point and the output tunnel end-point, therefore collaborate to set up the communications path between the first and second sub-networks.

Advantageously, following the reception step, the method comprises a step of verifying the presence, in the relay activation message, of a tunnel identifier associated with said local relay and in correspondence with an identifier of said input tunnel end-point, said tunnel identifier identifying a tunnel of said output tunnel end-point.

Thus, the output tunnel end-point can clearly identify the relay concerned. Advantageously, said method preliminarily comprises the following steps:

receiving, from said input tunnel end-point, a global trace-route message for tracing communications paths within said extended communications network;

modifying a relay descriptor of the global trace-route message, said descriptor referring to the input tunnel end-point, said modification consisting in setting up a correspondence between an identifier of an output tunnel of said output tunnel end-point with the input tunnel end-point;

transmitting the global trace-route message modified via said output tunnel.

The descriptor inserted by the input tunnel end-point is complemented by the output tunnel end-point with an output tunnel port identifier. The output tunnel end-point which is involved in the relay is identifiable by means of the output tunnel identifier. The different descriptors thus entered enable the insertion, into the relay activation message, of all the relays to be activated in order to route a data frame between a first LAN and a second LAN. Furthermore, the descriptor associated with a relay in a multi-TEP LAN thus has the same format as a descriptor associated with a relay in a single-TEP LAN, thus providing compatibility with a manager tunnel end-point and tunnel end-points of the simple TEP LAN that do not know the multi-TEP LAN.

In an astute aspect of the invention, the relay activating step performed by the output tunnel end-point enables the path to be set up for a communication in the direction going from the first sub-network to the second sub-network.

The output tunnel end-point activates the relay for a part of the path going from the first sub-network. The frames of this first sub-network will be transmitted on the multi-TEP LAN by the output tunnel end-point to the second sub-network. This makes it possible not to take account, in the application of the activated relay, of the source addresses of the frames arriving by a tunnel to the tunnel end-point and to routinely transmit them to the local LAN (i.e. the multi-TEP LAN). The input tunnel end-point is then responsible for distinguishing the frames to be relayed to its tunnels from the frames intended solely for the local LAN (i.e. the multi-TEP LAN).

Advantageously, said relay activating step includes a step of stopping a filtering of the data frames coming from said first sub-network by elimination of an address associated with said input tunnel end-point in a frame filtering table of the output tunnel end-point.

Thus, the relays can be activated by simple updating of the bridge device routing tables which constitute the tunnel end-points. The filtering operations on the frame source address complement the similar filtering mechanisms applied to frame source addresses already present in a bridge device. This especially facilitates the routing by frame relays coming from the second sub-network.

Advantageously, the filtering is done on a field of source addresses of said data frames, said field corresponding to a virtual address which is allocated by the tunnel end-point of said intermediate network having received said data frames and which represents the tunnel via which said frames have been received.

Thus it is possible in a simple way to distinguish the input tunnel from the frames retransmitted on the multi-TEP LAN and thus perform the filtering and routing of these frames in a simple and efficient way.

The invention also relates to a computer-readable storage medium, storing a computer program comprising a set of instructions executable by a computer in order to implement a method for setting up a communications path between a first communications sub-network and a second communications sub-network by means of an intermediate sub-network, in an extended communications network, said extended communications network comprising a plurality of sub-networks, each sub-network having at least one tunnel end-point to enable the interconnection of said sub-network with at least one other sub-network of said plurality of sub-networks by means of at least one communications tunnel via a backbone network.

This computer readable storage medium is remarkable in that said intermediate sub-network comprises at least two tunnel end-points and in that said set of instructions performs the following steps when it is executed by an input tunnel end point of said intermediate sub network:

receiving, from a tunnel of said input tunnel end-point, a relay activation message to set up said path, said message referring to a local relay involving said input tunnel end-point;

determining, from said relay activation message, an output tunnel end-point of said intermediate sub-network involved in the local relay;

activating the local relay for a part of said path between said first sub-network and said second sub-network;

transmitting the relay activation message to said output tunnel end-point.

The invention also relates to a computer-readable storage medium, storing a computer program comprising a set of instructions executable by a computer in order to implement a method for setting up a communications path between a first communications sub-network and a second communications sub-network by means of an intermediate sub-network, in an extended communications network, said extended communications network comprising a plurality of sub-networks, each sub-network having at least one tunnel end-point to enable the interconnection of said sub-network with at least one other sub-network of said plurality of sub-networks by means of at least one communications tunnel.

This computer readable storage medium is remarkable in that said intermediate sub-network comprises at least two tunnel end-points and in that said set of instructions performs the following steps when it is executed by an input tunnel end point of said intermediate sub network:

receiving, from an input tunnel end-point of said intermediate sub-network, a relay activation message for setting up said path, said message referring to a local relay involving said input tunnel end-point and said output tunnel end-point;

activating the local relay for a second part of said path between said first sub-network and said second sub-network, complementary to a first part of said path for which said local relay has been activated by said input tunnel end-point.

The invention also pertains to an input tunnel end-point of an intermediate sub-network, a communications path having to be set up between a first communications sub-network and a second communications sub-network by means of said intermediate sub-network, in an extended communications network, said extended communications network comprising a plurality of sub-networks, each sub-network having at least one tunnel end-point to enable the interconnection of said sub-network with at least one other sub-network of said plurality of sub-networks by means of at least one communications tunnel via a backbone network.

In a remarkable way, said intermediate sub-network comprises at least two tunnel end-points and the input tunnel end-point comprises:

means for receiving, from a tunnel of said input tunnel end-point, a relay activation message to set up said path, said message referring to a local relay involving said input tunnel end-point;

means for determining, from said relay activation message, an output tunnel end-point of said intermediate sub-network involved in the local relay;

means for activating the local relay for a part of said path between said first sub-network and said second sub-network;

means for transmitting the relay activation message to said output tunnel end-point.

In a useful way, the means for determining an output tunnel end-point comprise a relay descriptor, contained in the relay activation message, said relay descriptor comprising a tunnel identifier associated with said local relay and in correspondence with the input tunnel end-point, said tunnel identifier identifying a tunnel distinct from the tunnel or tunnels of said input tunnel end-point.

Advantageously, the input tunnel end-point comprises:

means for receiving a global trace-route message for tracing communication paths within said extended communications network;

means for adding a relay descriptor referring to the input tunnel end-point to the global trace-route message;

means for transmitting the modified global trace-route message to at least one other tunnel end-point of said intermediate sub-network.

According to another advantageous characteristic, the relay descriptor comprises means for identifying the tunnel of the input tunnel end-point via which the global trace-route message has been received by said input tunnel end-point.

Advantageously, the means for activating the local relay comprise means for setting up the path for a communication in the direction going from the second sub-network to the first sub-network.

The means for activating the local relay further comprise means for stopping a filtering of the data frames coming from said second sub-network by eliminating an address associated with said output tunnel end-point in a frame filtering table of the input tunnel end-point.

Advantageously, the means for stopping a filtering is applied on a source address field of said data frames, said field corresponding to a virtual address which is allocated by the tunnel end-point of said intermediate network having received said data frames and which represents the tunnel via which said frames have been received.

The invention also pertains to an output tunnel end-point of an intermediate sub-network, a communications path having to be set up between a first communications sub-network and a second communications sub-network by means of said intermediate sub-network, in an extended communications network, said extended communications network comprising a plurality of sub-networks, each sub-network comprising at least one tunnel end-point to enable the interconnection of said sub-network with at least one other sub-network of said plurality of sub-networks by means of at least one communications tunnel via a backbone network.

In a remarkable way, the intermediate sub-network comprises at least two tunnel end-points, and the output tunnel endpoint of said intermediate sub-network comprises:

means for receiving, from an input tunnel end-point of said intermediate sub-network, a relay activation message for setting up said path, said message referring to a local relay involving said input tunnel end-point and said output tunnel end-point;

means for activating the local relay for a second part of said path between said first sub-network and said second sub-network, complementary to a first part of said path for which said local relay has been activated by said input tunnel end-point.

Advantageously, the output tunnel end-point comprises, means for verifying the presence, in the relay activation message, of a tunnel identifier associated with said local relay and in correspondence with an identifier of said input tunnel end-point, said tunnel identifier identifying a tunnel of said output tunnel end-point.

The output tunnel end-point further comprises:

means for receiving, from said input tunnel end-point, a global trace-route message for tracing communications paths within said extended communications network;

means for modifying a relay descriptor of the global trace-route message, said descriptor referring to the input tunnel end-point, said modification consisting in setting up a correspondence between an identifier of an output tunnel of said output tunnel end-point with the input tunnel end-point;

means for transmitting the global trace-route message modified via said output tunnel.

In addition, the output tunnel end-point comprises means for setting up the path for a communication in the direction going from the first sub-network to the second sub-network.

Advantageously, the means for activating the local relay comprise means for stopping a filtering of the data frames coming from said first sub-network by eliminating an address associated with said input tunnel end-point in a frame filtering table of the output tunnel end-point.

In a useful way, the means for stopping a filtering is applied on a source address field of said data frames, said field corresponding to a virtual address which is allocated by the tunnel end-point of said intermediate network having received said data frames and which represents the tunnel via which said frames have been received.

5. LIST OF FIGURES

Other characteristics and advantages of embodiment of the invention shall appear from the following description, given by way of a non-exhaustive indicative example and from the appended drawings of which:

FIG. 1a illustrates a typical configuration of a Virtual Private Network (VPN) implementing a tunnel;

FIG. 2a presents an example of a classic layered model of a tunnel end-point in which the method of the invention can be implemented;

Figure 3:
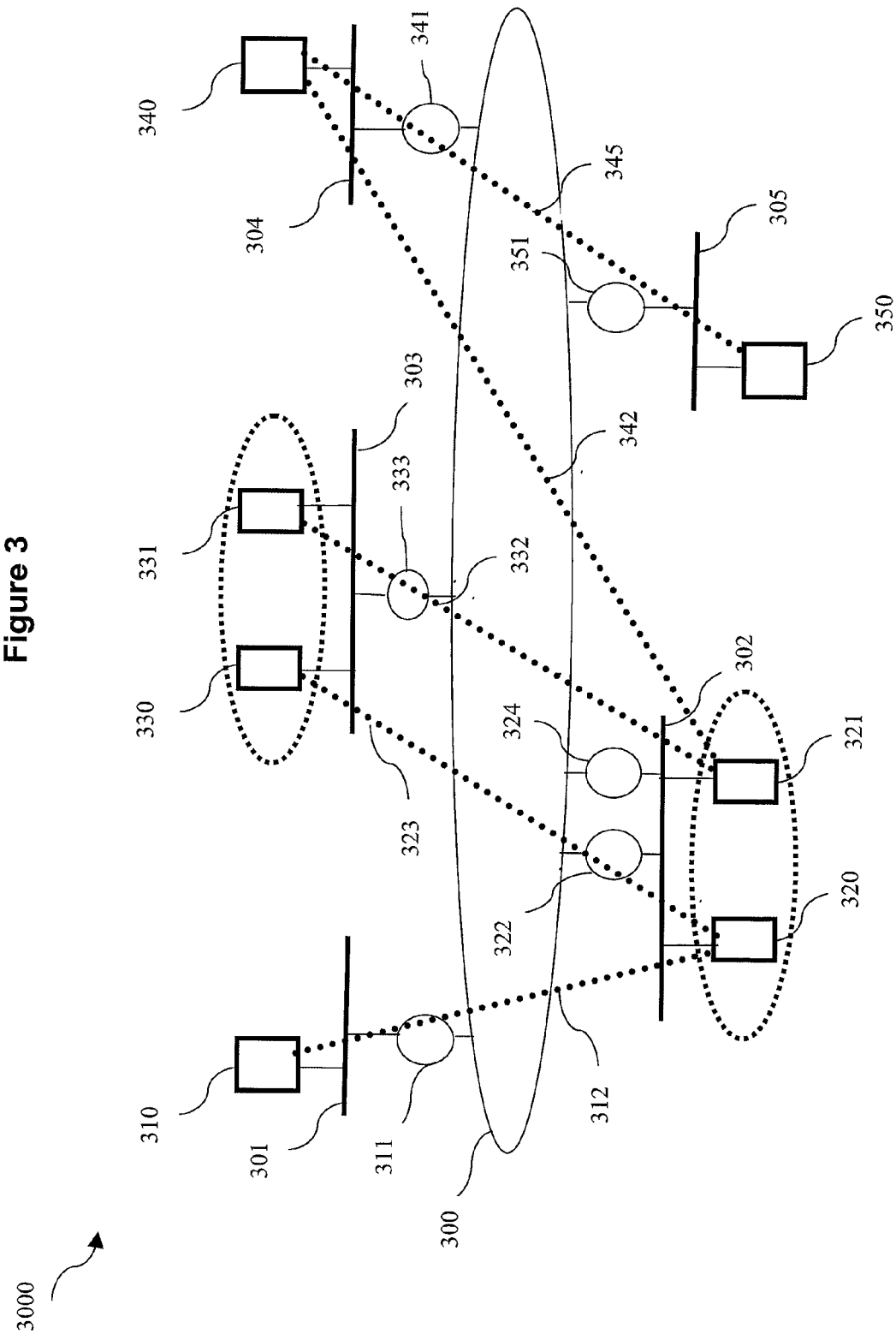
Figure 4A:
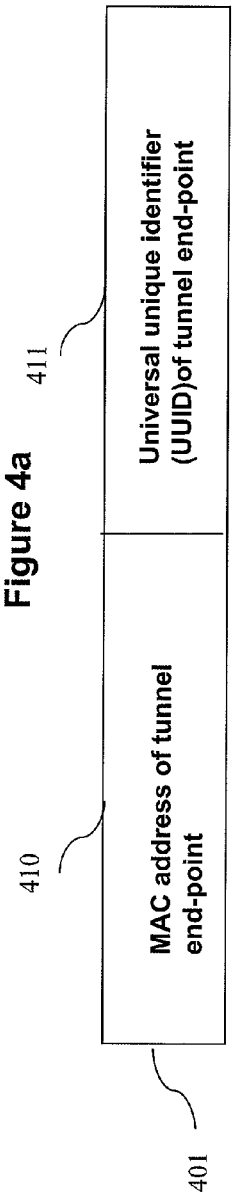
Figure 4B:
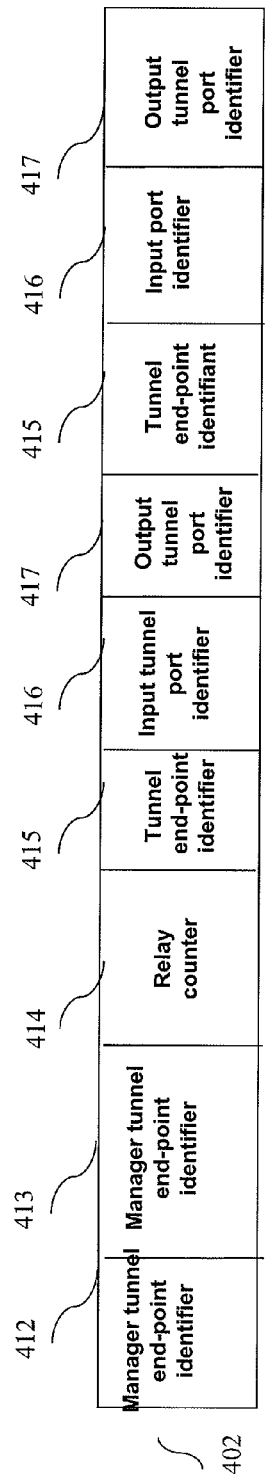
Figure 4C:
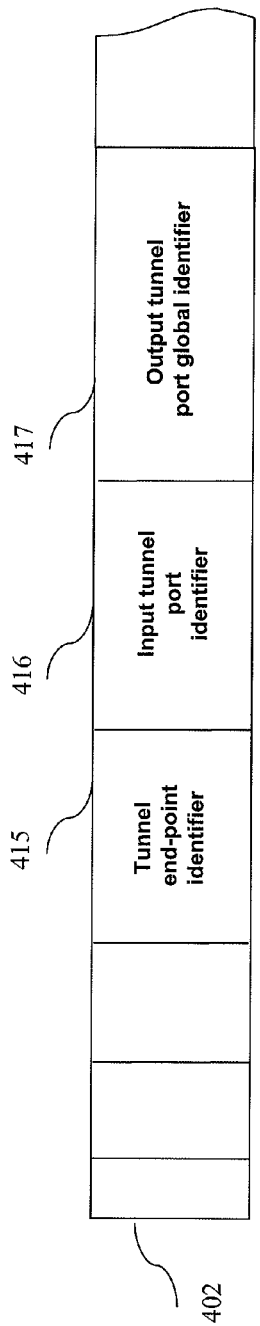
Figure 5A:
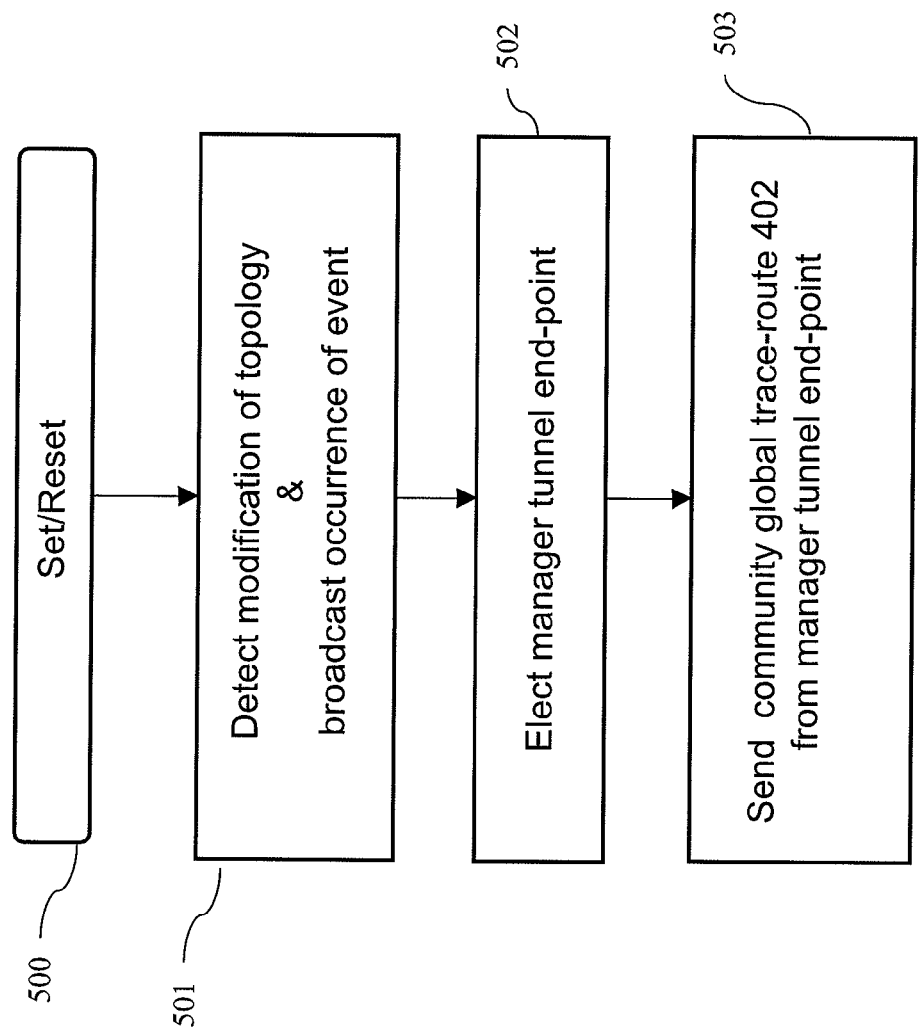
Figure 5B:
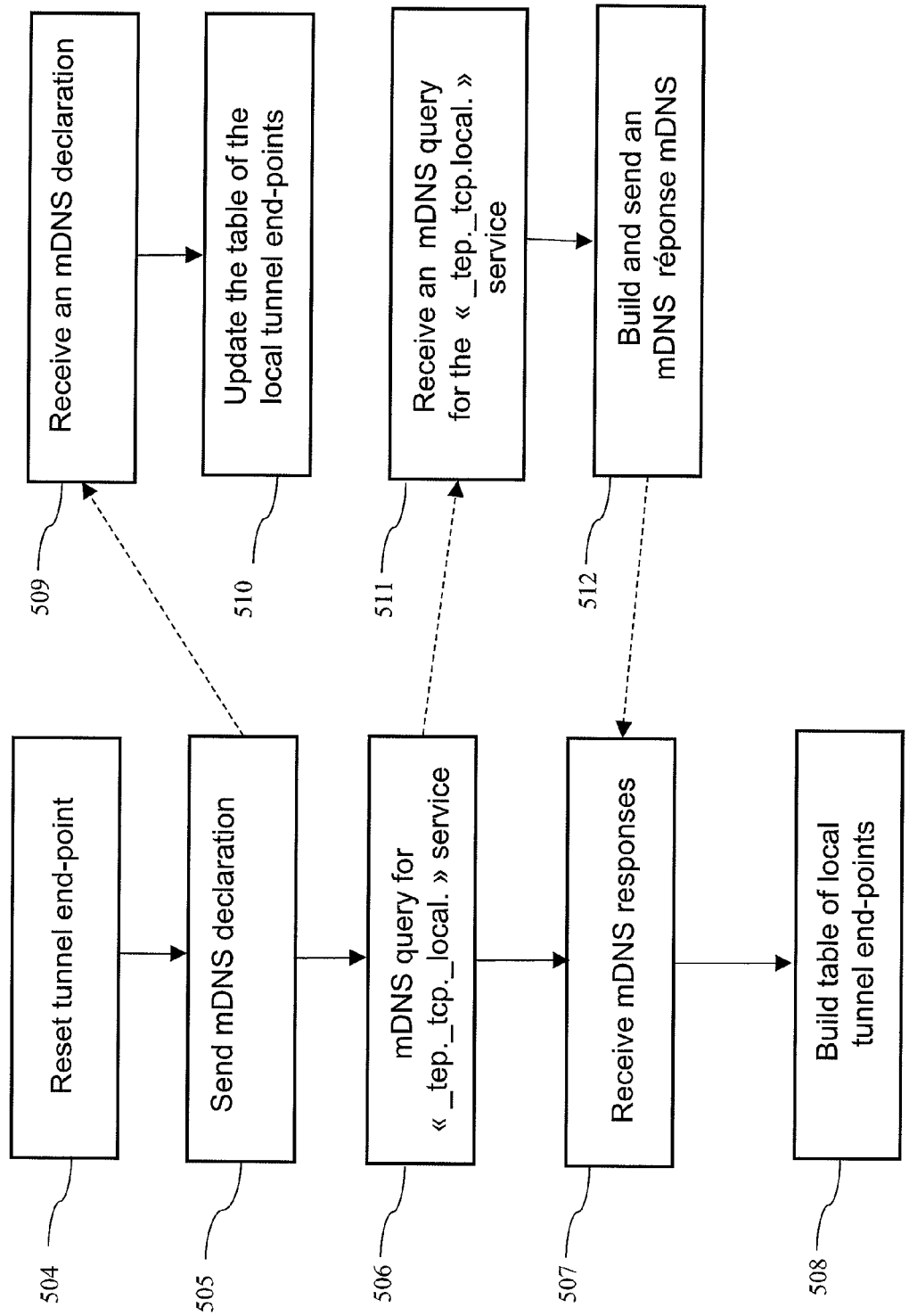
Figure 5C:
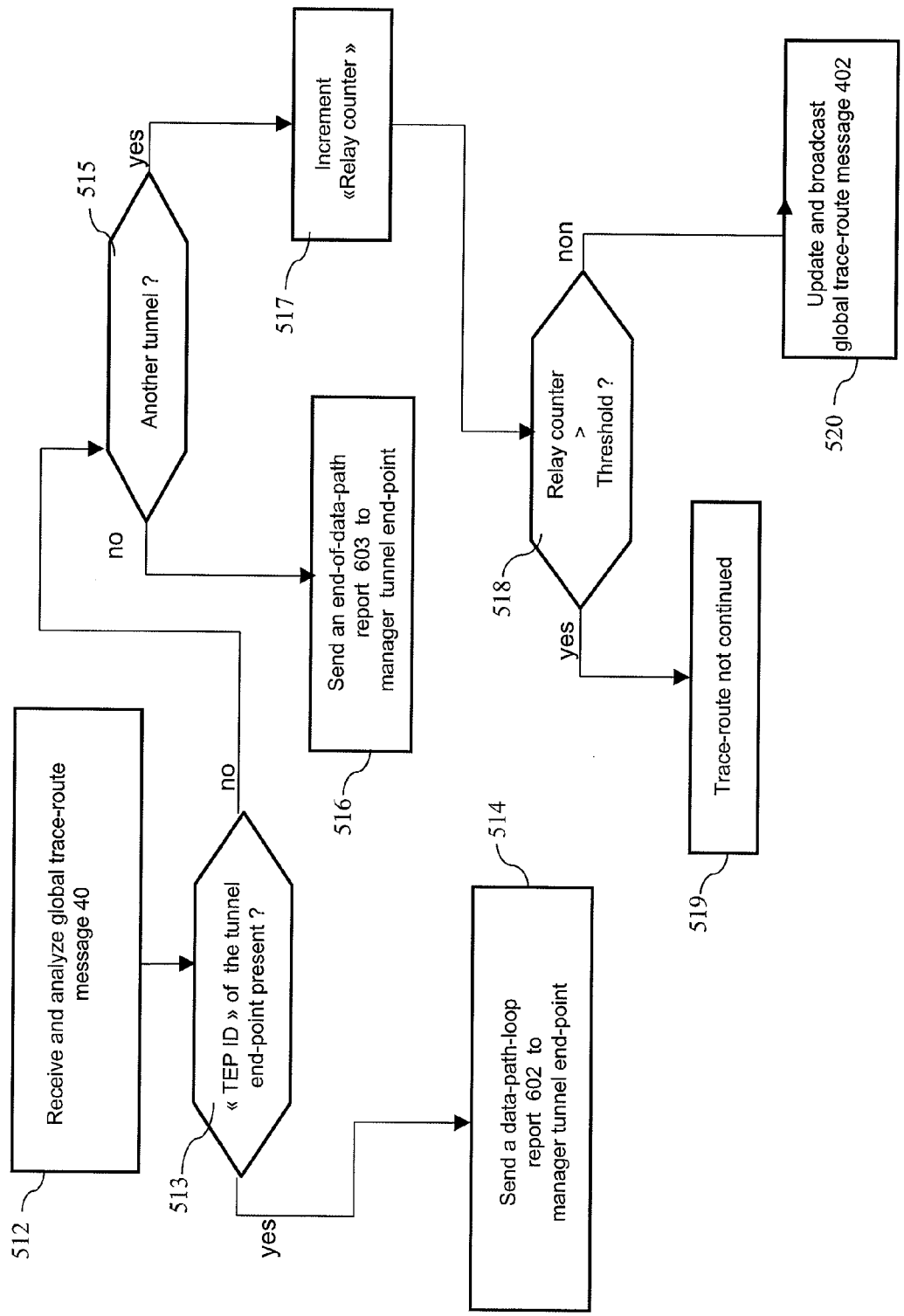
Figure 5D:
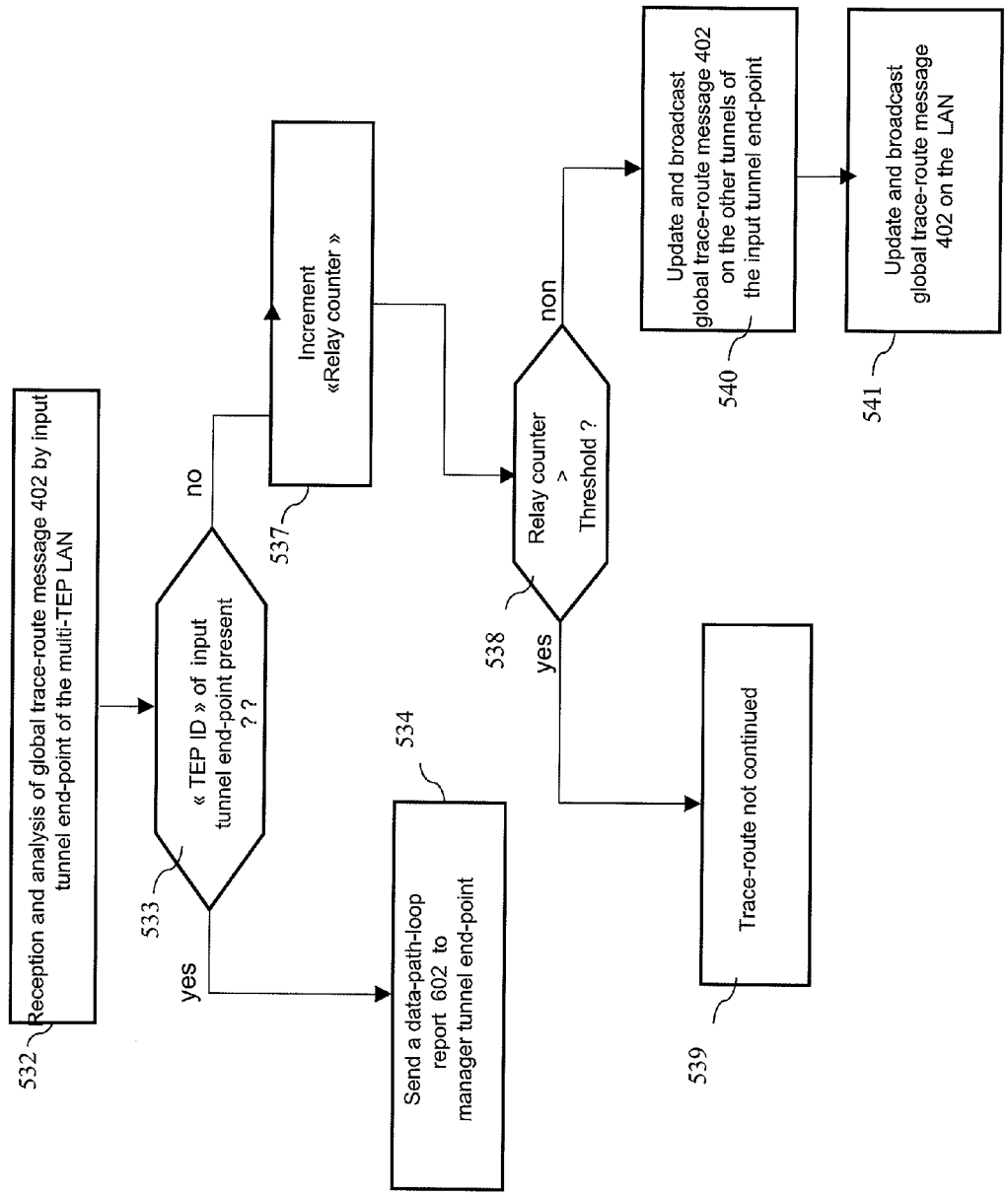
Figure 5E:
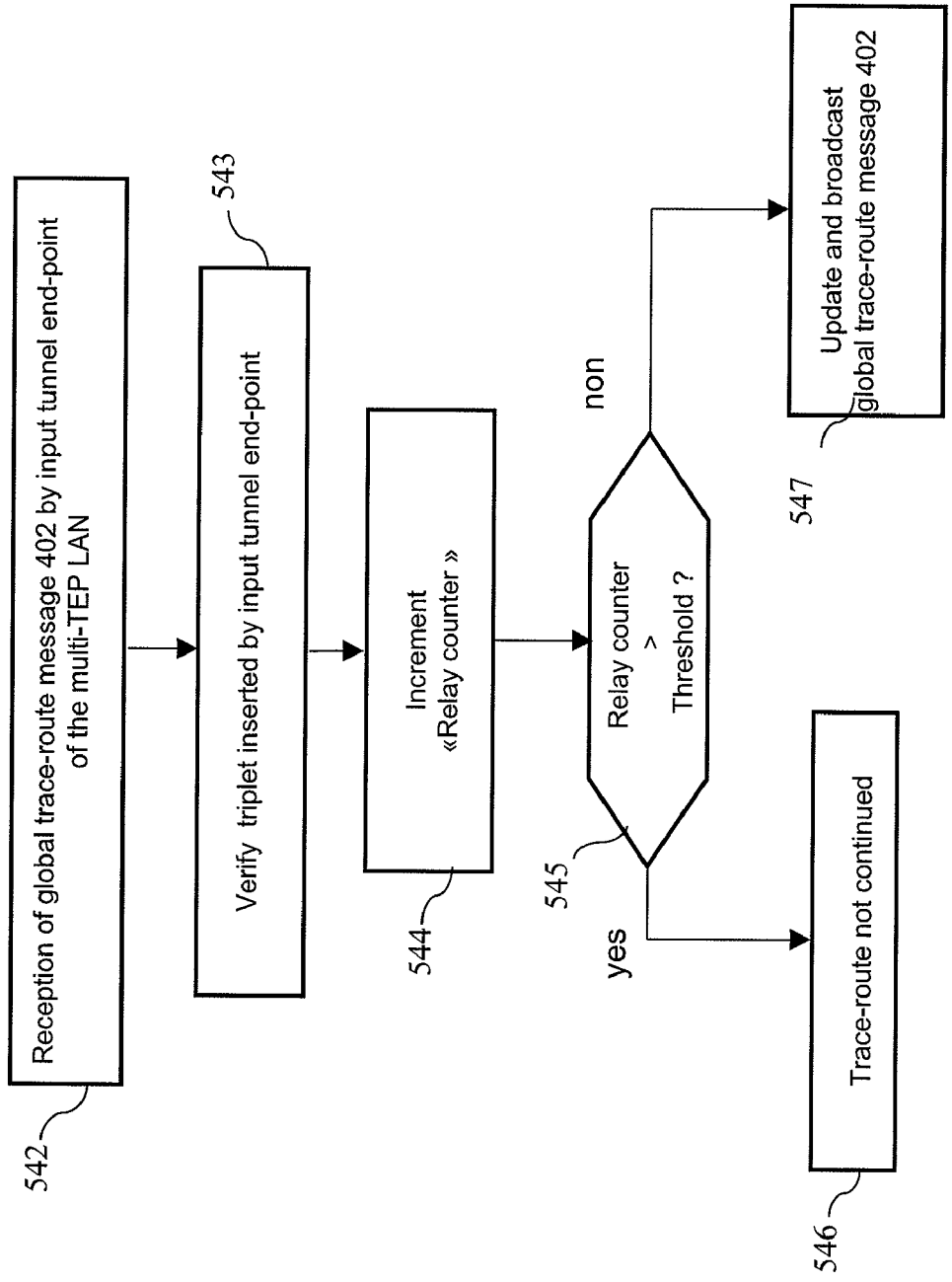
Figure 6A:
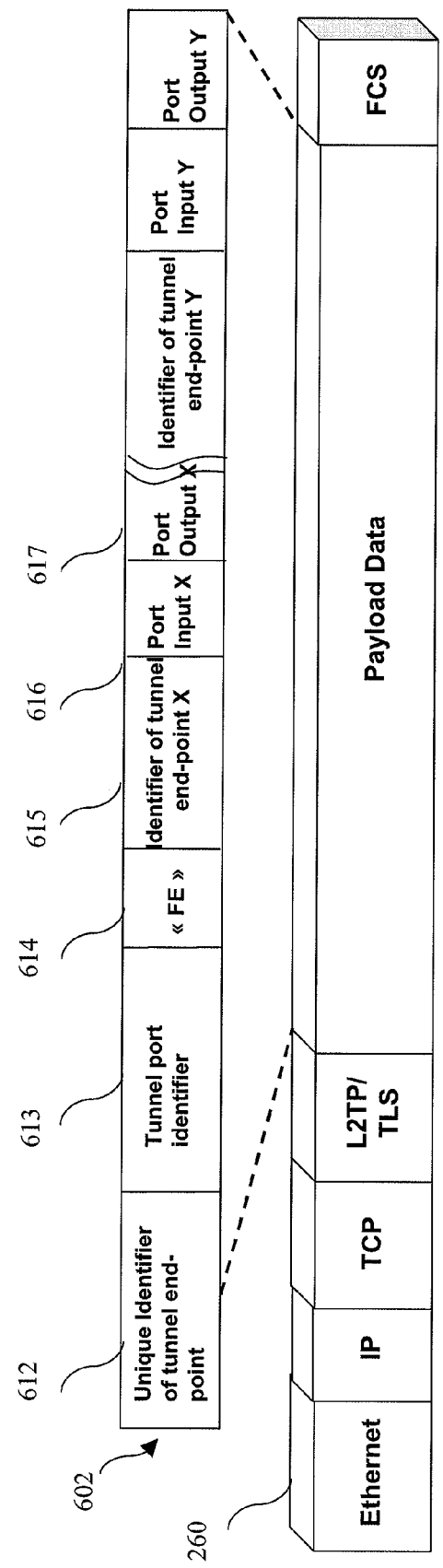
Figure 6B:
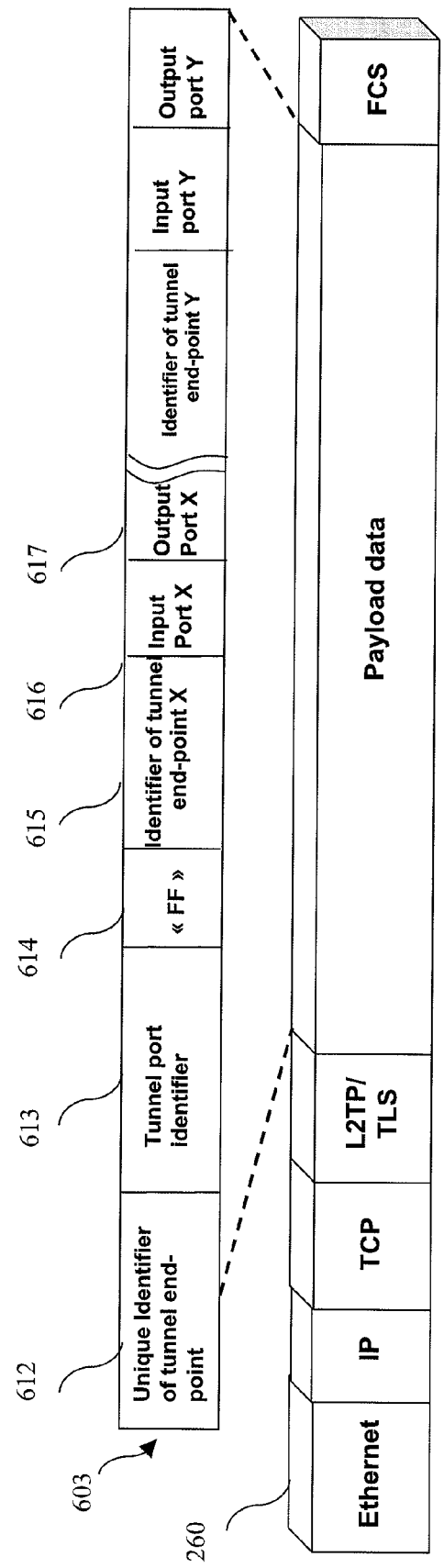
Figure 7:
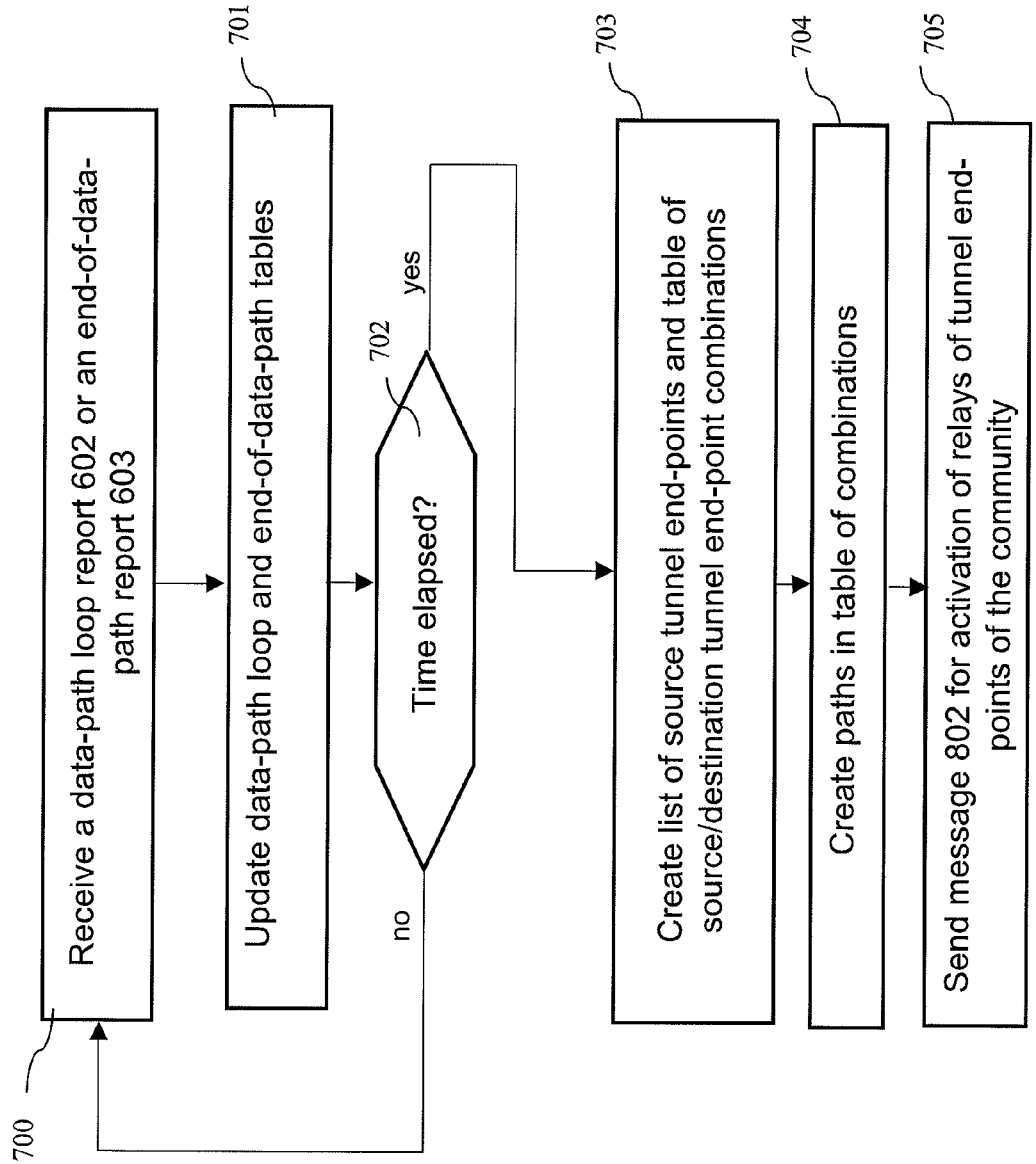
Figure 8:
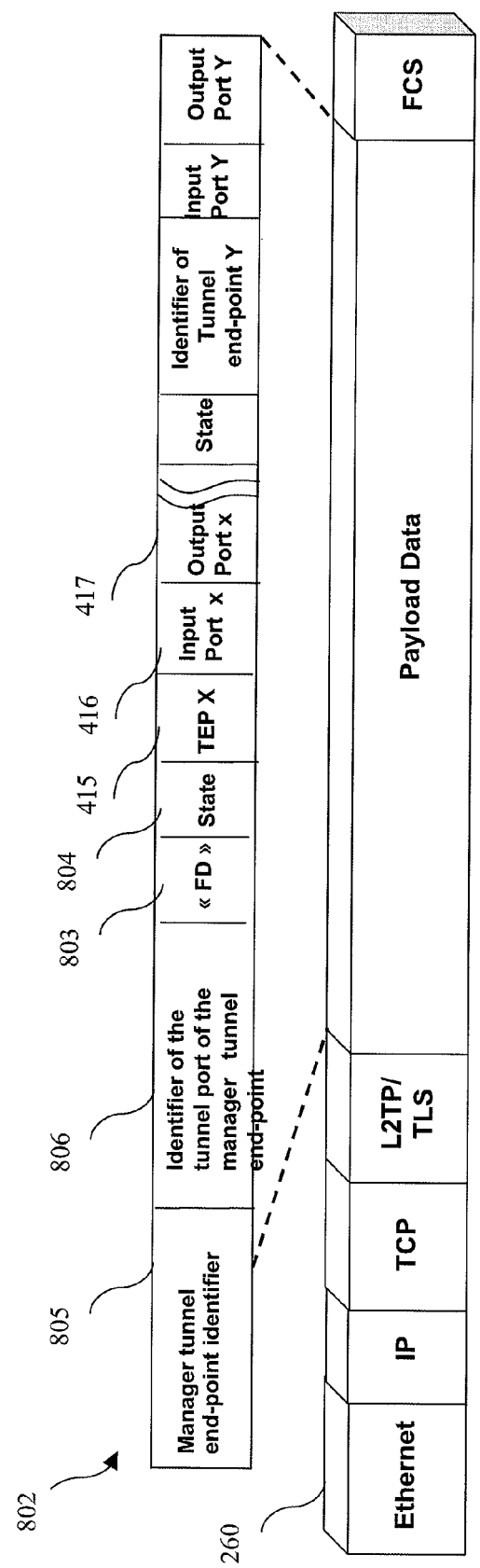
Figure 9:
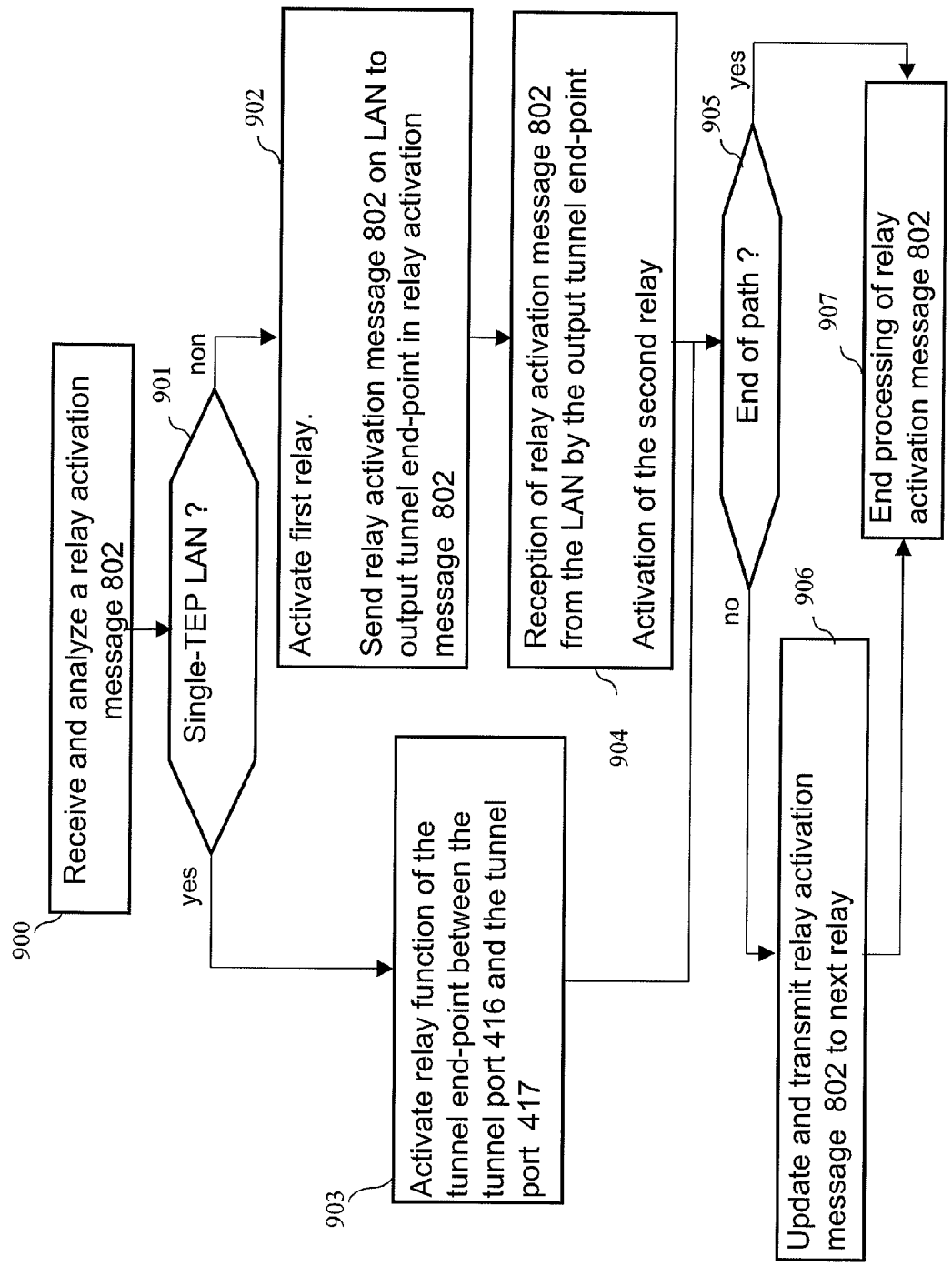
Figure 10:
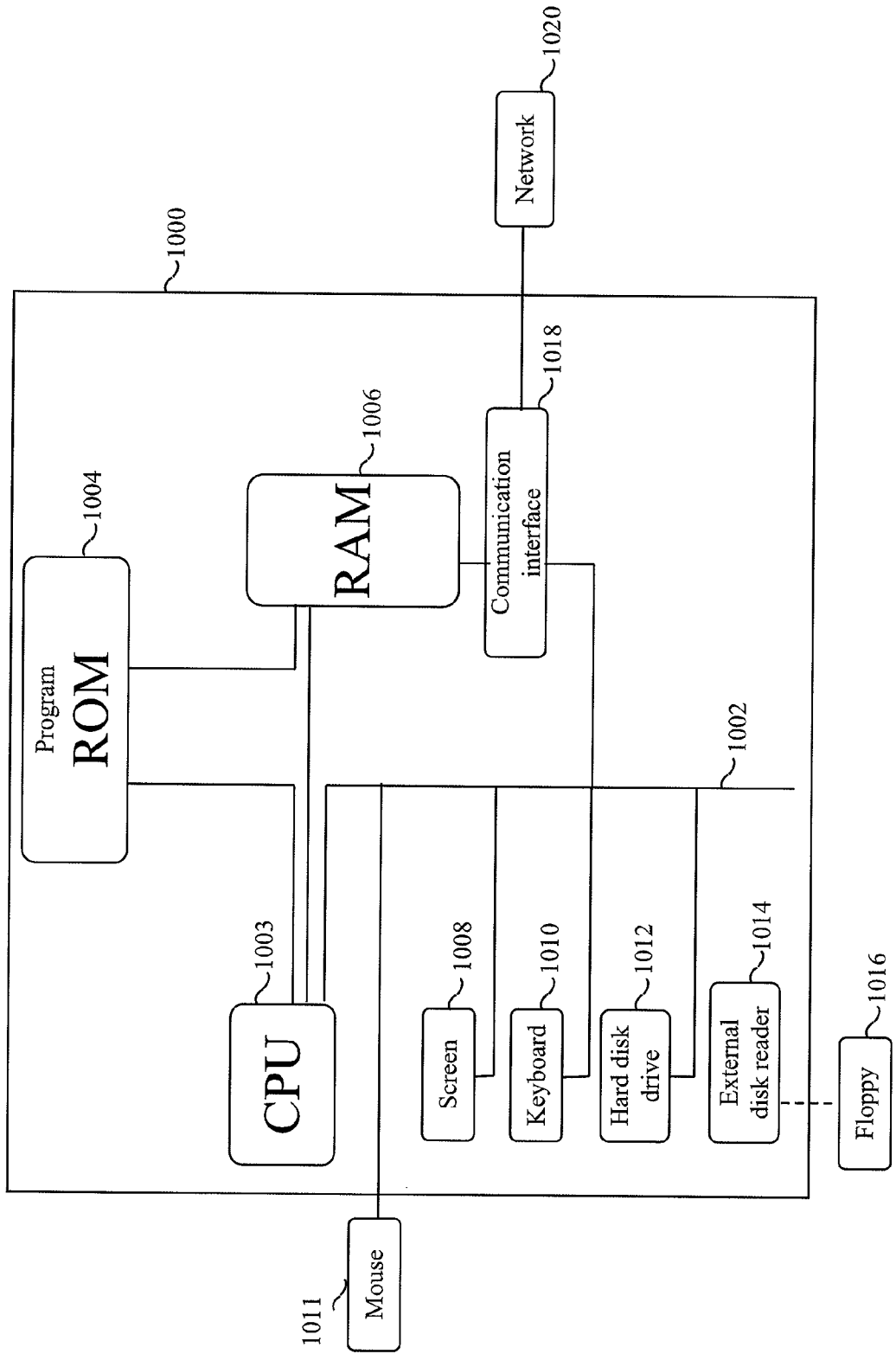

FIG. 3 presents the communications architecture of a network community in a network that is not totally meshed and includes local area networks with multiple tunnel end-points (also called multi-TEP LANs);

FIG. 4a illustrates a structure of an identifier "TEP ID" of a tunnel end-point;

FIG. 4b illustrates the structure of the different data fields of a global trace route message for the community network traveling via the single tunnel end-point LANs (or single-TEP LANs);

FIG. 4c illustrates the structure of the different data fields of a global trace-route message of the community network traveling via a multi-TEP LAN according to the invention;

FIG. 5a illustrates the step of updating the global topology of the community network and sending a global trace-route message of the community network from a manager tunnel end-point;

FIG. 5b is a flow chart illustrating the steps of the local trace-route operation for the tunnel end-points on a multi-TEP LAN in a particular embodiment of the invention executed by a tunnel end-point at initialization;

FIG. 5c is a flow chart illustrating the steps of reception and processing by a tunnel end-point situated on a single-TEP LAN of a global trace-route message of the community network;

FIG. 5d is a flow chart illustrating the steps of reception and processing by an input tunnel end-point situated on a multi-TEP LAN of a global trace-route message for tracing the network community;

FIG. 5e is a flow chart illustrating the steps of reception and processing of a global trace-route message of the network of the community by a tunnel end-point situated on a multiple TEP LAN;

FIG. 6a shows the structure of a data-path-loop report message;

FIG. 6b presents the structure of an end-of-data-path report;

FIG. 7 is a flow chart illustrating the steps of reception and processing of the data path loop and data path end reports by a manager tunnel end-point;

FIG. 8 illustrates the structure of a relay activation message initially sent out by a manager tunnel end-point;

FIG. 9 is a flow chart illustrating the steps of reception and processing of a relay function of a tunnel end-point at reception of a relay activation message for a tunnel end-point belonging to a single-TEP LAN and a multi-TEP LAN;

FIG. 10 is a drawing of a generic tunnel end-point capable of implementing each method according to a particular embodiment of the invention.

6. DETAILED DESCRIPTION

The present invention relates to a technique to prevent data path loops via a communications tunnel during the constitution, within a community, of an extended communications network formed by a set of local area networks, the interconnection of these local area networks being done for each of these local area networks by tunnels and inter-tunnel relay mechanisms, these mechanisms being activated in preventing the formation of data path loops within the network community thus created.

More specifically, should a plurality of tunnel end-points be connected to a same LAN, also called a multi-TEP LAN, the invention proposes a method for the tracing and management of the relay functions of the tunnel end-points belonging to this multi-TEP LAN in order to prevent a data path loop.

Figure 1A:
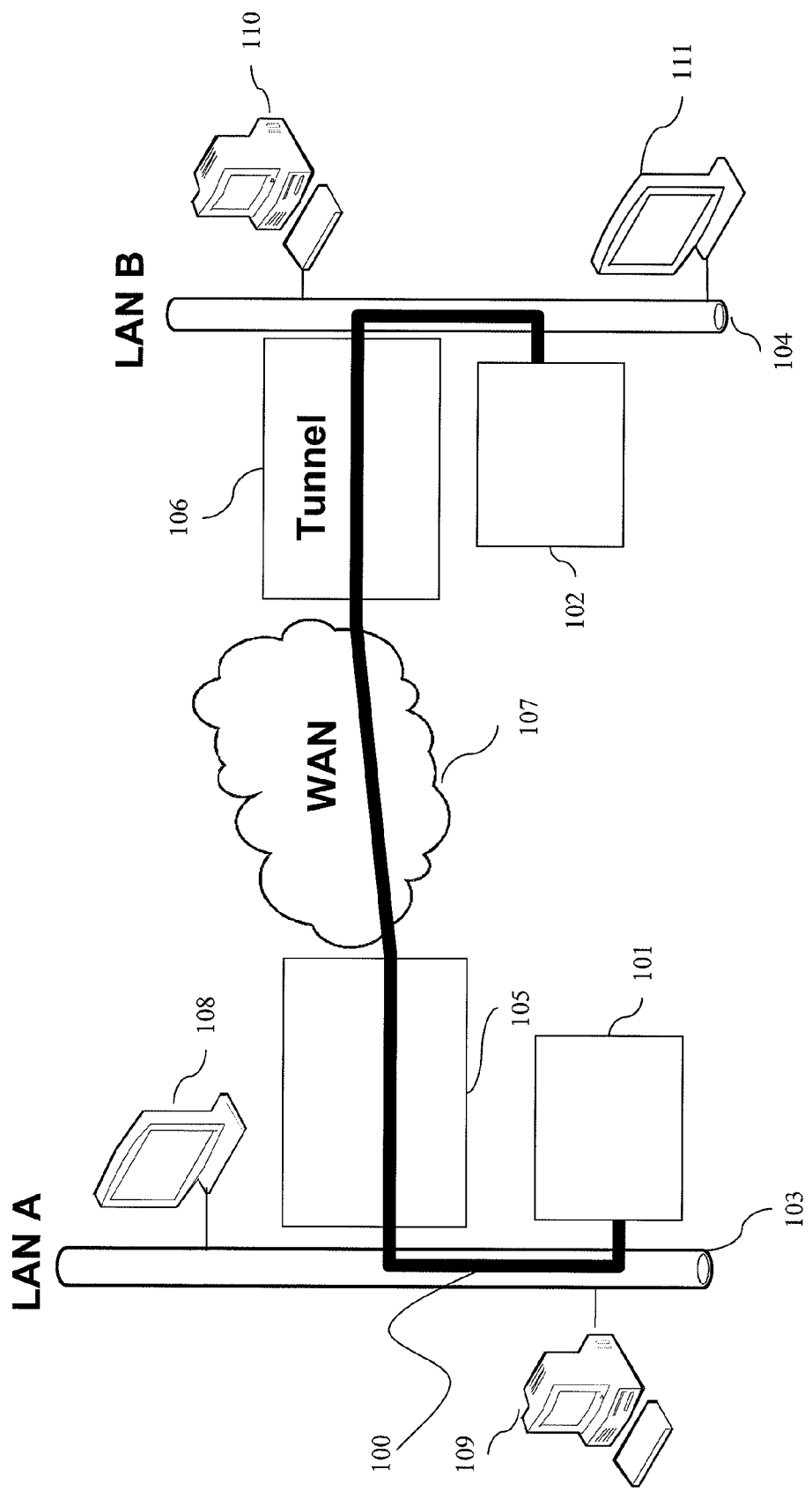

FIG. 1a illustrates the typical architecture of a virtual private network (VPN) type communications system enabling the interconnection, in this example, of two LANs 103 and 104 via a level 2 tunnel 100 supported by a WAN (or MAN) type communications network 107. Each of the networks, namely the LANs 103 and 104, respectively have a gateway type apparatus 105 and 106 for access to the WAN as well as terminal apparatuses 108, 109, 110, 111. The tunnel 100 is implemented by the tunnel end-points 101 and 102 respectively connected to the LAN 103 and to the LAN 104.

It must be noted that a tunnel end-point can be integrated into a fixed audiovisual apparatus such as a digital television set or a mobile audiovisual apparatus such as a camcorder. It can also be present in a PC type apparatus in the form of a program performing the functions associated with this PC type apparatus.

Once the tunnel 100 has been set up, the apparatuses 108 and 109 connected to the LAN 103 are capable of communicating with the apparatuses 110 and 111 connected to the LAN 104.

This FIG. 1a shows a simple communications network with only one tunnel but it is clear that one and the same tunnel end-point can be used to manage several tunnels (intended for an equivalent number of remote tunnel end-points) to interconnect a first LAN with several LANs, and that one and the same LAN can include several tunnel end-points. Furthermore, the infrastructure devices in the WAN have not been shown as in the case of an IP WAN such as an Internet type network consisting of a set of IP routers and satellite or optical type links and links providing interconnection by interconnection networks of a variety of types such as for example SDH, ATM and the like.

As illustrated in the figure, the virtual private networks are frequently used to interconnect two LANs in order to create an extended LAN consisting of the union two original LANs.

Classically, the secured virtual private networks include a cryptography and authentication algorithm used to ensure the secrecy of the data conveyed. A typical configuration of virtual private networks is based on a technique known as tunneling. In the example of FIG. 1, the tunnel end-points are not integrated into the gateways. The tunnel is set up between two tunnel end-points and each packet (also called a frame) sent to an apparatus connected to the remote LAN is encapsulated by the local tunnel end-point and then sent to the remote tunnel end-point which will de-encapsulate it and send it on the remote LAN. The apparatuses are virtually connected to a same LAN. An apparatus then, depending on the source address of a received frame, cannot determine whether this frame originates from the local LAN or from a remote LAN.

Figure 2A:
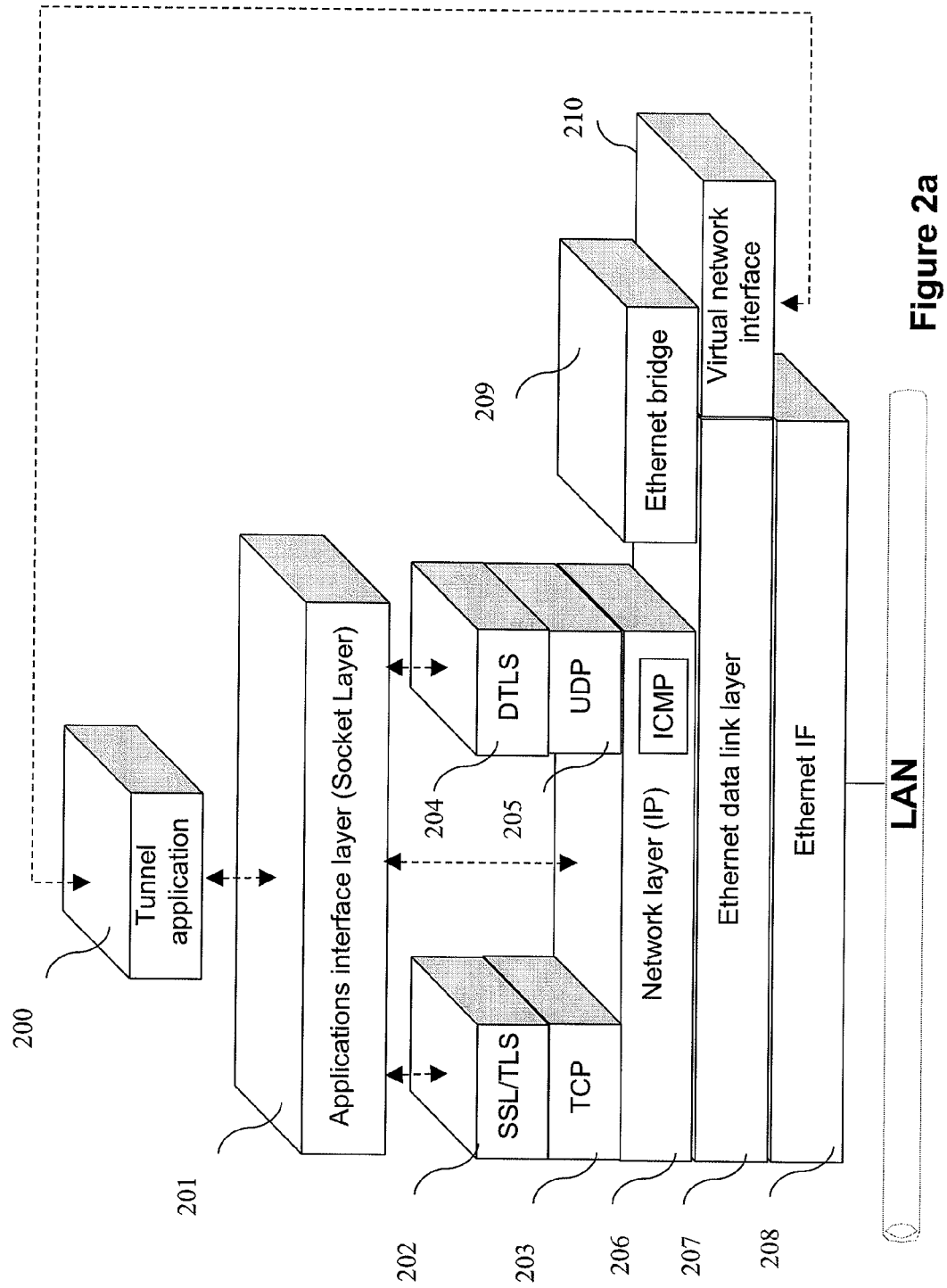
FIG. 2b illustrates the structure of a tunnel Ethernet frame conveying a level 2 user frame.
FIG. 2c illustrates the structure of an Ethernet tunnel frame conveying a global trace-route message according to the invention.

FIG. 2a represents a stack of protocols for a tunnel end-point used to describe the routing of an Ethernet frame coming from one of the frames 108, 109 of the LAN 103 which will enter a tunnel 100. To this end, a layered model is used to describe the protocol layers needed to implement this tunnel 100. This model shows only the protocol elements needed for functions other than the implementation of the tunnel. The tunnel end-point 101 (FIG. 1a) has an Ethernet physical interface 208 which hands over the Ethernet frames coming from the apparatuses 108, 109 to the link layer 207 for routing to the network layer 206 in the case of the Ethernet frames addressed to the apparatus comprising the tunnel end-point or to the bridge layer 209 in the case of the other Ethernet frames. The bridge layer 209 performs the classic operations of an Ethernet bridge such as the filtering of the Ethernet frames and the relaying of these frames to the appropriate output Ethernet port or ports. An Ethernet interface 207 and at least one virtual interface 210 simulating an Ethernet controller are attached to the bridge. A virtual interface 210 is created for each tunnel instantiated by the application 200 to which it hands over the Ethernet frames that must travel on the respectively instantiated tunnel. Generally, the tunnel encapsulation protocol represented by the application 200 performs the operations needed to implement each tunnel. These operations include configuration, filtering and encapsulation (forming a tunnel packet) and extraction of a frame. The frames received from the virtual interface 210 after processing by the application 200 are handed over in the form of packet via an applications interface 201 to a reliable transport protocol (TCP) 203 or non-reliable UDP transport protocol 205 respectively secured by the SSL protocol 202 and DTLS protocol 204. After processing by a transport protocol to form the tunnel packet 250 (FIG. 2b), this packet is retransmitted to the network layer 206. It must be noted that the protocol ICMP forms an integral part of this protocol layer which can furthermore perform the fragmentation and reassembly operations. The IP datagram thus formed with the tunnel packet can now be transmitted on the LAN via the link layer 207 and physical layer 208. The reception of a frame coming from the tunnel 100 will follow the reverse path to the one presented here above.

FIG. 2b shows the format of an Ethernet frame 260 resulting from the implementation of the level 2 encapsulation protocol by the application 200 (FIG. 2a). A tunnel packet 250 has four parts: the header of the transport protocol 251, namely TCP or UDP, the header of the encapsulation protocol 252, namely L2TP/TLS, the header of the passenger protocol 253, namely Ethernet and finally the user data 254 comprising a full IP datagram if no fragmentation has taken place during its transit from the source apparatus. The Ethernet frame 260 represents the Ethernet frame conveying the IP datagram containing the tunnel packet 250 which travels in transit in the LANs.

FIG. 2c represents an Ethernet frame 260 conveying a tunnel control message 270. These messages are exchanged between the tunnel end-points in order to set up tunnels and manage them in general. In the present invention, global trace-route messages 402 relating to the topology of the network (as described here below with reference to FIG. 4a described here below) are an example of a tunnel control message 270. The message 270 comprises:
  a header field 270 with 8 bytes set at the value "FF";
  a field 272 "F" indicating whether the message is a query (value 0) or a response (value 1);
  an ID field 273 representing the identification of the sender;
  a field "CMD" 274 which is a command field;
  a "Status" field 275 indicating the status in the case of the response message;
  a "Length" field 276 indicating the length of the data;
  a "Data" field 277 representing the complementary data to be exchanged between the tunnel end-points.

FIG. 3 shows an example of an architecture of a extended communications network 3000 of a community of sites not totally meshed. The different local area networks 301, 302, 303, 304 and 305 of the extended communications network 3000 are respectively connected to a WAN (or MAN) type backbone network 300 by means of gateways 311, 322, 324, 333, 341 and 351. The terminals connected to these LANs can communicate with one another by means of level 2 tunnels designated as 312, 323, 332, 342 and 345. Thus the communications may be:
  either "direct" i.e. directly between two LANs connected by a tunnel such as for example the LANs 301 and 302 connected by the tunnel 312 set up between the tunnel end-points 310 and 320;
  or "indirect", i.e. indirectly by means of a relay function activated on a multi-TEP LAN or on a single-TEP LAN such as for example that of FIG. 3 for the LANs 301 and 305 by the setting up of links between the tunnels 312 and then 342 and then 345 set up and managed by the tunnel end-points 310, 320, 321, 340 and 350. In order to enable this indirect communication between the terminals of the LANs 301 and 305, the tunnel end-points 320 and 321 each have their relay function activated. The tunnel end-point 340 situated on a single-TEP LAN also has its activated relay function. The terminals connected to the LAN 301 can also communicate with the terminals connected with the LAN 305 within the community by the activation of the relay function of each of the tunnel end-points belonging to the different intermediate LANs.

FIG. 4a represents the structure of an identifier 401 of a tunnel end-point, also called "TEP ID" used in this invention to address and identify tunnel end-points. The use of this identifier 401 is described in greater detail here below. The identifier is formed by the concatenation, on 22 bytes, of:
  a MAC (Media Access Controller) address 401 on 6 bytes assigned to the physical port connecting the tunnel end-point to the LAN, and
  a UUID (Universally Unique Identifier) on 16 bytes generated by this tunnel end-point whenever the system is powered on and enabling a distributed system to uniquely identify the object in an unambiguous manner (non-centralized management).

It must be noted that several prior-art methods known to those skilled in the art are used to generate this UUID 411. The method of generating the UUID is documented especially in the ITU-T Rec. X.667 and ISO/IEC 9834-8:2005 standards.

FIG. 4b illustrates the structure of the different data fields of a global trace-route message 22 relative to the community network traveling via the single tunnel end-point LANs (also called single-TEP LANs). This global trace-route message is transmitted according to a broadcasting mode in which it is sent to all the other tunnel end-points, i.e. it does not connect any destination address of a given tunnel end-point but a multicast address. Thus, after reception by a tunnel end-point of a global trace-route message 402 initially broadcast by a manager tunnel end-point (whose role is described here below), a new global trace-route message 402 is built from the global trace-route message 402 initially received by this tunnel end-point, and then duplicated and transmitted on each of the tunnels managed by this tunnel end-point except by the tunnel via which the initial global trace-route message 402 has reached this tunnel end-point. This global trace-route message 402 classically contains three fields 412, 413, 414 and then a series of triplets formed by three fields 415, 416 and 417, each triplet representing each tunnel end-point with a crossed relay function.

The "ID TEP manager" field 412 is the identification of the manager tunnel end-point having sent the global trace-route message 402. The "sender port" field 413 is the number of the port via which this global trace-route message 402 has been sent by the manager tunnel end-point. The "relay counter" field 414 represents the number of relays that this global trace-route message 402 has crossed. The field 414 prevents a global trace-route message 402 from indefinitely creating a loop in the extended communications network 3000 (as described here below) as a result for example of routing problems. The initial value of the field 414 indeed represents the threshold beyond which the global trace-route message 402 is deemed to require destruction. The initial value of the field 414 is directly related to the number of sites of the extended communications network 3000. This value is decremented each time a relay is crossed and the message is deemed to require destruction when this value becomes null.

The next three fields 415, 416 and 417 of the global trace-route message 402 are inserted as and when the global trace-route message 402 moves forward in the extended communications network 3000. During the crossing of each potential relay discovered during the network exploration and tracing phase, the global trace-route message 402 inserts the triplet 415, 416, 417 corresponding to said relay. The way in which they are filled when crossing the multi-TEP LAN is described here below with reference to the following FIG. 4c.

For a single-TEP LAN (304) as described in FIG. 3, i.e. a LAN comprising a single tunnel end-point, the TEP ID field 415 also represents the identification of the LAN (304) supporting this unique tunnel end-point (as described in FIG. 4). The "input port" field 416 represents the number of the tunnel port via which the global trace-route message 402 reaches this tunnel end-point. Finally, the "output port" field 417 represents the number of the port of the tunnel via which the global trace-route message 402 is retransmitted by this tunnel end-point to another LAN.

Thus, at each crossing of a single-TEP LAN, the tunnel end-point receiving the global trace-route message 402 inserts, into said global trace-route message 402, its corresponding triplet 415, 416 and 417. Each tunnel end-point of single-TEP LAN inserts and positions these three fields 415, 416 and 417 upon reception of a global trace-route message 402.

FIG. 4c illustrates the payload part of a global trace-route message 402 used according to the invention when it travels in transit on a multi-TEP LAN 302 as described in FIG. 3. The fields 412, 413 and 414 are identical to those described with reference to FIG. 4b. The global trace-route message 402 first of all enters the multi-TEP LAN 302 from a tunnel attached to an input tunnel end-point 320.

The global trace-route message 402 is modified by this input tunnel end-point 320 then retransmitted locally on the multi-TEP LAN 302 towards an output tunnel end-point 321 also situated on the multi-TEP LAN 302. The global trace-route message 402 is then modified by this output tunnel end-point 321 connected to the multi-TEP LAN and then retransmitted, by a tunnel attached to said output tunnel end-point 321, to the local area network of a following remote site such as for example the single-TEP LAN 304 or else the multi-TEP LAN 303 of FIG. 3.

It must be noted that the term "input tunnel end-point" refers to the tunnel end-point which, in a multi-TEP LAN, first receives the global trace-route message 402 and subsequently the relay activation message 802. The output tunnel end-point is the tunnel end-point which, when distinct from the input tunnel end-point, sends back the global trace-route message (402) and subsequently the relay activation message (802) to another LAN.

After these processing operations, the global trace-route message 402 must preserve a structure similar to the structure of a global trace-route message 402 retransmitted after the crossing of a single-TEP LAN. The global trace-route message 402 must preserve this structure in order to have identical processing at the manager tunnel end-point level during the final analysis of the paths on the basis of the reports generated by each site during the global trace-route method (analysis described here below).

When this global trace-route message 402 travels on the multi-TEP LAN, the fields 416 and 417 are updated differently than they are during the updating of the global trace-route message 402 performed by a tunnel end-point situated in a singe-TEP LAN.

Thus, when the input tunnel end-point 320 retransmits the global trace-route message 402 on the multi-TEP LAN 302 to an output tunnel end-point 321 situated in a same multi-TEP LAN 302, the input tunnel end-point 320 inserts a triplet having a different content consisting of a:
field 415 representing a TEP ID identifier of the input tunnel end-point 320 as described here above;
a field 416 representing an identifier of the input tunnel port of the input tunnel end-point 320 via which the global trace-route message 402 has arrived.

This input tunnel port identifier of the input tunnel end-point 320 has a local significance at the multi-TEP LAN 302 (and not simply local to this input tunnel end-point 320) and is therefore known to the other tunnel end-points of the same multi-TEP LAN 302 thanks to the identifier assignment mechanisms of the tunnel port used during the execution of the local trace-route method for the local tracing of the tunnel end-points with respect to one another (this method is described here below with reference to FIG. 5b). In one embodiment of the invention, a tunnel port identifier is for example an numerical integer value sequentially incremented for all the ports of a same tunnel end-point.

According to the invention, each tunnel end-point of a multi-TEP LAN 302 is thus assigned a unique and comprehensive numbering interval for a tunnel port in taking, as most significant bits for these numbers, an index of local significance at the multi-TEP LAN 302 which is unique for this tunnel end-point and is assigned dynamically to the local tunnels during the local trace-route method. The least significant bits of the tunnel port identifier have local significance at said tunnel end-point, with a value that is initially at zero and then incremented sequentially by one unit at the creation of a new tunnel on this same tunnel end-point.

This index used for the most significant bits of this tunnel port identifier for a tunnel managed by a given tunnel end-point may be chosen for example on the basis of the least significant bits of the Ethernet MAC address of the port of the LAN of this same tunnel end-point.

Thus, there are no collisions between these unique tunnel port identifiers (or numbers) for a multi-TEP LAN enabling the identification of a given tunnel end-point on this multi-TEP LAN. Collision is prevented by the fact that each tunnel end-point has knowledge of the numbering intervals assigned to the other tunnel end-points of the same multi-TEP LAN by knowledge of the indices and Ethernet MAC addresses of the other tunnel end-points of the multi-TEP LAN.

Thus, each tunnel end-point of a multi-TEP LAN knows the MAC addresses of the other tunnel end-points of the multi-TEP LAN and has an index associated with each of these other tunnel end-points determining a numbering interval for the tunnel ports for this tunnel end-point (most significant bit). This notion of an index used for the most significant bits of the tunnel port number which identify a tunnel end-point on the multi-TEP LAN, and the notion of sequential numbers used for the least significant bits which identify a port tunnel on this same tunnel end-point can be likened, barring certain differences, to the hierarchical addressing used for the IETF IP protocol well known to those skilled in the art. Indeed, in the IP protocol, comparably, the most significant bits of the IP address determine the address of a network and the least significant bits determine the address of a station on this network.

After having introduced the structure of the different constituent elements of the present invention with reference to the above figures, we shall now explain the different steps during the execution of the method of the invention.

It must be noted that the particular context of the present invention is defined by the fact that the traffic of input and output Ethernet frames that circulate from/to a tunnel and come from or are addressed to an Ethernet terminal connected to the LAN is always possible. And this is so independently of the activation or the activation of the relay function of the tunnel end-point attached to this LAN. Thus, the deactivation of the relay function of a tunnel end-point does not block the stream of input Ethernet streams entering by this tunnel end-point and addressed to this LAN.

More specifically, the present invention proposes a method of management of the activation of the tunnel end-point relay function, the activation of these tunnel end-point relay functions creating no redundant paths and loops in the case of a network comprising at least one multi-TEP LAN.

FIG. 5a illustrates different steps during the detection of an event for modifying the global topology of the community network activated, in a first step 501, once a setting or resetting step 500 has been done by at least one of the following events:

powering on/powering off a tunnel end-point, which is equivalent to inserting a new node of the interconnection network of the sites within the community;

setting up/eliminating a new tunnel from a tunnel end-point of a LAN A to a tunnel end-point of a remote LAN B, these two tunnel end-points already forming part of the network and the two LANs belonging to the community, which is equivalent to the insertion of a new physical link between two nodes of the network of the community.

It must be noted that the event may pertain to an operation requested by a user or an operation resulting from the expiry of a timer that launches the execution of a routine program from a terminal connected to the LAN or even connected to a remote LAN.

Then, the tunnel end-point informs the entire community of the occurrence of this event for modifying the global topology of the network by broadcasting a message transmitted in a manner known to those skilled in the art, for example with an Ethernet broadcast type message which will be received by all the other tunnel end-points. The propagation to the community takes place then in such a way that each tunnel end-point receiving this message in turn generates an identical message only once (or again a copy) on all the tunnels connected to it except for the tunnel via which this message has reached the tunnel end-point.

In a step 502, the tunnel end-points proceed to elect a manager tunnel end-point which will be responsible in the invention for setting up the paths for all the possible couples within the community, the couples being constituted by a source LAN and a destination LAN having to exchange data directly or indirectly thanks to activated relay functions of the tunnel end-points (as described here below with reference to FIG. 7). This election is done according to methods known to those skilled in the art such as for example the method used for the election of the root bridge in the first step of the Spanning Tree Protocol (STP) algorithm of the IEEE 802.1.D standard. In this algorithm, each switch node or bridge node has a unique identifier (ID) chosen as its MAC address and a configurable priority number, the combination of these two elements constituting the BID (Bridge Identification) used to elect a root bridge that is unique in the network. Each node initially considers the elected node to be a root bridge and reports it in a message that it sends to its neighbors. It then compares its value with the value contained in the messages received from its neighbors (first of all depending on the priority numbers and then, in the event of equality, the node with the lowest ID identifier prevails). Since all the MAC addresses are unique, the algorithm will converge on the election as a root bridge of a unique node. The priority number is normally left by default but the LAN administrator may, if he wishes it, modify this number to obtain the election of a particular node. In this invention, a similar procedure will be followed in using an identifier TEP ID 401 as described in FIG. 4a.

In a step 503, the manager tunnel end-point sends a traceroute message 402 in multicast mode to trace the global topology of the community as described in FIG. 4a.

Referring now to FIG. 5b, we present a flow chart illustrating the actions to be executed when resetting a tunnel end-point situated on a LAN.

Each tunnel end-point must make itself known and get to know of the existence or absence of other tunnel end-points present on the LAN as well as their characteristics.

To this end, each tunnel end-point implements a TCP/UDP/IP protocol stack well known to those skilled in the art (as described with reference to FIG. 2a) as well as the mDNS (Multicast DNS) and DNS-SD (DNS-based service discovery) protocols as described in the IETF reports and also in the specifications of the general consumer apparatus network protocols.

Other approaches can be based on the SSDP protocol of the family of UPnP protocols or else they may be based on the presence of a logic name server and IP address server or else again they may be based on one of the many networked equipment and service discovery protocols well known to those skilled in the art such as the IETF, SLP, IETF SDP, Web Services Device, WS-Discovery or the like.

The different active tunnel end-points of a LAN will trace one another mutually through their connection to this LAN and the use of these protocols in likening the tunnel end-point apparatus and its functions accessible from the LAN to a service.

The different active tunnel end-points will thus be recognized by means of these protocols, each publishing a "tep_tcp.local" service entity. This entity must have a single name. Thus, for example, this name is obtained by the concatenation of the "_TEP-" field and the MAC address of the concerned tunnel end-point. An example is the entity of the "_tep._tcp_local." service present on the tunnel end-point whose address is the MAC address "5E.FF.56.A2.AF.15" named "_TEP-5EFF56A2AF15". The MAC address mentioned here above which shall here below be called a "local MAC address" is the one used as a source address for the Ethernet frames sent from the tunnel end-point on the LAN to which the tunnel end-point is connected, and whose tunnel end-point is the source. This differs from the method used in this same tunnel end-point for the transmission, on the LAN, of the frames received beforehand via a tunnel associated with it, i.e. frames that have been generated by remote Ethernet terminals (connected to other LANs).

These remote Ethernet frame terminals, which reach the tunnel end-point via a tunnel 260 in encapsulated form as described with reference to 2b, will be retransmitted after de-encapsulation to return to a format identical to that of the Ethernet frame initially generated by the remote Ethernet terminal. The retransmitted frame will resume the data of the encapsulated frame 260 received from the tunnel using the fields 253 and 254, except however for the field corresponding to the source MAC address which will be modified by the tunnel end-point.

Thus, the tunnel end-point replaces the source MAC address initially contained in the field corresponding to the Ethernet frame of the remote terminal by a MAC address different from the local MAC address of the tunnel end-point. This second type of MAC address managed by each tunnel end-point shall be called a "virtual MAC address". This virtual MAC address is associated uniquely with each tunnel managed by the tunnel end-point. This replacement of the source MAC address by the tunnel end-point is a case of use of a technique known to those skilled in the art as a MAC spoofing.

Each tunnel end-point therefore has a local MAC address as well as set of virtual MAC addresses each associated with one of the many tunnels which one and the same tunnel end-point can manage simultaneously. A given virtual MAC address is used by a given tunnel end-point for all the remote frames reaching a remote LAN via the tunnel with which said virtual MAC address is associated.

This principle of source MAC address substitution raises no problems for the final receiver terminal, for which this frame is intended, for the response frame is built by the final receiver terminal from the ARP (Address Resolution Protocol) cache table according to which terminal associates the IP address of a terminal with its MAC address. Indeed, this ARP cache table is built from MAC address values contained in the payload part of the ARP response frame received in response to the ARP query frame which the terminal had sent beforehand to set up the association between an IP address and a MAC address. It can therefore be noted that this ARP cache table is not built out of the MAC address of the header of the ARP response frame, and that the source MAC address substitution, done by a tunnel end-point relaying a frame, received from a tunnel, on the LAN to which the tunnel end-point is connected, therefore has no effect on communications between remote terminals.

It will be noted that a unicity probing step in the mDNS protocol is not needed because the unicity of the MAC address ensures the unicity of the name of the entity.

After a step 504 for resetting the tunnel end-point (powering on or setting up a hot-plug into the LAN), in a step 505 each active tunnel end-point sends out an mDNS service announcement. A tunnel end-point is said to be active when it has at least one tunnel set up, this mDNS service announcement being done by an IP multicast message.

It is important to note that the steps 504 to 508 described here below are executed by a tunnel end-point to be announced on a LAN and the steps 509 to 512 are executed by the other tunnel end-points which may be present in the same LAN (in a multi-TEP LAN).

In the step 505, the tunnel end-point to be announced generates a mDNS service announcement. This announcement is transmitted in the form of a multicast message to the other tunnel end-points present in the LAN. This multicast message has a group destination address or multicast address. Each node of a network concerned by this type of message listens to frames comprising this destination address.

In a step 509, all the other tunnel end-points present in this same LAN (other than the tunnel end-point to be announced) thus receive this mDNS service announcement message.

Then, in a step 510, each tunnel end-point uses the data contained in this service announcement message to update a filtering table that is proper to said LAN and has said other tunnel end-points situated in it. This filtering table, generated during a step 508 (described here below) contains, for each of the other tunnel end-points present in this same LAN, a recording containing the local MAC address of these other tunnel end-points and all the virtual MAC addresses that each of these other tunnel end-points associates uniquely with each of their tunnels.

With this tunnel end-point initialized at the step 504 being then known and identified by the other tunnel end-points by its announcement, what remains to be done is to ensure that this tunnel end-point initialized at the step 504 will discover the other active tunnel end-points already present on the LAN.

To this end, at a step 506, the tunnel end-point to be declared generates an mDNS query for the "_tep._tcp.local." service. This query is then transmitted in the form of a multicast message to the other tunnel end-points present in the LAN.

Upon reception of this query (step 511), each of the other active tunnel end-points present on the LAN sends (step 512) the tunnel end-point having sent out the announcement an mDNS response comprising classically, according to the mDNS protocol, the name of its instantiation (or entity) of the "_tep._tcp.local." service ("_TEP-5EFF56A2AF15" in the case of the previous example), the indication of the number of tunnels set up, its local MAC address and its list of virtual MAC addresses that it associates uniquely with the tunnels set up associated with it, for the source MAC address substitution of the frames sent out by the remote terminals etc.

The reception of these responses from each of the other tunnel end-points, again according to the mDNS protocol, is done in a step 507, each response comprising the name of its service entity "_tep._tcp.local.".

In a step 508, depending on the mDNS responses received by the tunnel end-point that has made the announcement, a filtering table is created and initialized with the information previously extracted during the step 507.

Each LAN thus has a corresponding table of local tunnel end-points present in each tunnel end-point. In this table, each entry corresponding to a tunnel end-point possesses a field containing the local MAC address of this tunnel end-point, the number of tunnels set up on this tunnel end-point, the list of virtual MAC addresses associated uniquely with these tunnels for the MAC address substitution of the frames sent by the remote terminals, and an index used for the definition, in a single numbering slot unique to this tunnel end-point on this LAN, of the number (or identifier) assigned to each tunnel port on this tunnel end-point (in the context of a multi-TEP LAN).

Each tunnel end-point will therefore have a filtering table for the active tunnel end-points present on the LAN and represented by the names of the instances of the "_tep._tcp.local." service. Thus, each tunnel end-point can extract, from this filtering table, the local and virtual MAC addresses of the other tunnel end-points, the number of tunnel ports managed by the other tunnel end-points and finally the numbering slot used by each of the other tunnel end-points.

If the tunnel end-point initialized at the step 504 receives responses on its LAN, said LAN passes into multi-TEP mode. If not, it remains in single-TEP mode defined as being the default mode.

FIG. 5c illustrates a method of processing performed at the reception, by a tunnel end-point situated on a single-TEP LAN, of a global trace-route message 402 sent out by a community manager tunnel end-point. The following FIGS. 5d and 5e describe the processing performed, according to the invention, upon reception of a global trace-route message 402 by a tunnel end-point situated on a multi-TEP LAN.

In a first step 512, the tunnel end-point of the single-TEP LAN considered receives a global trace-route message 402 on one of its ports associated with a tunnel and analyses this message.

In a step 513, this tunnel end-point first of all checks that its identifier 401 "TEP ID" is in the field 415 of one of the triplets 415, 416 and 417 contained in the global trace-route message 402 received (FIGS. 4a and 4b).

If the response is affirmative, the propagation of the global trace-route message 402 in the rest of the network is stopped and, thanks to the information contained in the global trace-route message 402 received, the tunnel end-point of the single-TEP LAN considered, in a step 514, generates a data-path-loop report 602 (which shall be described here below with reference to FIG. 6) addressed to the manager tunnel end-point which has sent out the trace-route message (FIG. 5a). This data-path-loop report 602 is sent out especially via the tunnel port by which the global trace-route message 402 has been received on the single-TEP LAN. Indeed, if the "TEP ID" identifier of the tunnel end-point of the single-TEP LAN considered is in one of the fields 415 of the global trace-route message 402 received, it means that this tunnel end-point is already processed this global trace-route message 402 and therefore that there is an existing data path loop.

To build this data-path-loop report 602, the tunnel end-point of the single-TEP LAN considered inserts its "TEP ID" identifier 401 into a field 415 of a new triplet 415, 416, 417 as described here above (FIG. 4b) and a value "FE" in the relay counter field 414 (FIGS. 4b and 6a). This value FE is then recognized as being a data path loop type report by the manager tunnel end-point as well as by all the tunnel end-points situated on the path between the tunnel end-point of the single-TEP LAN considered and the manager tunnel end-point. The tunnel end-point of the single-TEP LAN could thus route the data-path-loop report 602 to the manager tunnel end-point in using the field 416 of the triplet 415, 416, 417 associated with its own TEP ID identifier (identifying the tunnel that connects it to the previous LAN in the journey of the global trace-route message 402 sent out by the manager tunnel end-point). Thus, going from one tunnel end-point to the next, the data-path-loop report 602 reaches the manager tunnel end-point which had initially sent out the trace-route message.

At the step 513, if the identifier 401 of the tunnel end-point is not in one of the fields 415 of the global trace-route message 402 received, a step 515 is used to ascertain that the tunnel end-point has another tunnel than the one via which the global trace-route message 402 has reached the single-TEP LAN.

If the answer is negative, the TEP then, in a step 516, generates an end-of-data-path report 603. To build this end-of-data-path report 602, the tunnel end-point of the single-TEP LAN considered inserts its identifier "TEP ID" 401 into the field 415 of a new triplet and a value FF into the relay counter field 414 (FIGS. 4b and 6b). This value is then recognized as an "end-of-data path" type report by the manager tunnel end-point and all the tunnel end-points situated on the path between the tunnel end-point of the single-TEP LAN considered and the manager tunnel end-point.

The unique tunnel end-point of a single-TEP LAN can thus route the end-of-data-path report 603 to the manager tunnel end-point, using the field 416 of triplets 415, 416 and 417 associated with its own identifier "TEP ID" 401 (as described here above). Thus, going from one tunnel end-point to the next, the end-of-data-path report 602 will reach the manager tunnel end-point which had initially sent out the trace-route message.

Should the tunnel end-point of the single-TEP LAN considered possess other tunnels then, in a step 517, the relay counter field 414 is incremented by one unit.

In a step 518, the new value of the relay counter is then compared with the value of a predetermined threshold.

The value of this threshold is linked to the size of the network of the community. A value suited to a set of LANs situated in one community (which for example could be a set of dwellings belonging to a group of friends or to a same family) is for example "7", meaning that the path between two LANs can take seven relay LANs. Another element of choice for setting the value of this threshold is the transmission time introduced by the use of a relay LAN in the communication between two LANs of this community, as well as requirements in terms of maximum transmission time for applications executed on the terminals connected to these end LANs of the path taken by the communication.

If the relay counter field 414 has a value greater than the predetermined threshold value then, in a step 519, the global trace-route message 402 is ignored and the tunnel end-point of the single-TEP LAN considered does not retransmit it to other LANs.

If not, in a step 520, the tunnel end-point of the single-TEP LAN considered inserts a triplet of fields 415, 416 and 417, corresponding respectively to its identifier "TEP ID", the number of the input tunnel port via which the global trace-route message 402 has arrived to this tunnel end-point and the number of the output tunnel port via which the global trace-route message 402 is retransmitted by this tunnel end-point (for each tunnel that is different from the input tunnel).

FIGS. 5d and 5e give an illustration, in one embodiment of the invention, of the reception and method of processing on a multi-TEP LAN 302 of the global trace-route message 402 (FIG. 3).

Once the global trace-route message 402 entering on a multi-TEP LAN 302 by a tunnel is attached to an input tunnel end-point 320 of said multi-TEP LAN 302, this global trace-route message 402 is modified by this input tunnel end-point 320 and then retransmitted on the multi-TEP LAN 302 to an output tunnel end-point 321 of the multi-TEP LAN. This global trace-route message 402 is then modified and retransmitted to the following remote LANs by said output tunnel end-point 321.

After these processing operations, the global trace-route message 402 keeps a structure similar to that of the global trace-route message 402 traveling via and sent by a tunnel end-point situated on a single-TEP LAN, namely a triplet of fields 415, 416 and 417 inserted by each traced LAN. This provides for identical processing at the level of the manager tunnel end-point during the analysis of the data-path-loop and end-of-data-path report.

However, when this global trace-route message 402 travels on a multi-TEP LAN, the fields 416 and 417 are updated in a way that is different from the updating performed during the transit of the global trace-route message 402 on a single-TEP LAN.

FIG. 5d illustrates a reception of this kind and processing of this kind of the global trace-route message 402 received by an input tunnel end-point 320 situated on a multi-TEP LAN 302.

In a step 532, the input tunnel end-point 320 receives a global trace-route message 402 (sent out by a manager tunnel end-point) on one of its ports associated with a tunnel. This input tunnel end-point 320 takes reception of this global trace-route message 402 and then analyses it to determine, in a step 533, whether its identifier TEP ID 401 is already in one of the fields 415 of the triplets 415, 416 and 417 contained in said global trace-route message 402.

If the response is affirmative, the global trace-route message 402 stops being propagated in the rest of the network. Using information contained in the global trace-route message 402 received, the input tunnel end-point 320, in a step 534, generates a data-path-loop report 602 which is then sent to the manager tunnel end-point via the tunnel port by which the global trace-route message 402 was received by this input tunnel end-point 320.

To build this data-path-loop report 602, the input tunnel end-point 320 inserts its identifier "TEP ID" 401 into a field 415 of a new triplet and a value FF into the relay counter field 414 of the global trace-route message 402. This value FE is especially recognized as a "data-path-loop" type report by the manager tunnel end-point and all the tunnel end-points situated on a path defined from the input tunnel end-point 320 to the manager tunnel end-point.

The tunnel end-point 320 of a multi-TEP LAN can thus route the data-path-loop report 602 in unicast mode to the manager tunnel end-point, using the field 416 (identifier of the input tunnel port of the input tunnel of triplets 415, 416 and 417 associated with its own identifier "TEP ID" 401. Thus, going from one tunnel end-point to the next, the data-path-loop report 602 will reach the manager tunnel end-point which had initially sent out the trace-route message.

The case of the routing of the data-path-loop report 602 on a multi-TEP LAN is obtained, according to the invention, elegantly by means of the notion of the identifier of the tunnel port of the input tunnel end-point 320, the identifier being a "global number". Indeed, the input tunnel end-point 320 receiving the data-path-loop report 602 coming from the WAN via an input tunnel is capable of identifying the next tunnel end-point on the path to the manager tunnel end-point by means of the global tunnel port number and is therefore capable of causing it, for example in unicast IP mode, to route the data-path-loop report 602 to the next tunnel end-point.

If the identifier TEP ID 401 of the input tunnel end-point 320 is not present in one of the fields 415 of triplets of fields 415, 416 and 417 contained in the global trace-route message 402 then, in a step 537, the relay counter field 414 of the global trace-route message 402 is incremented by one unit. The value of the field 4114 is then compared, in a step 538, to the value of the predetermined threshold (described earlier with reference to FIG. 5c).

If the value of the relay counter field 414 is greater than the value of the predetermined threshold then, in a step 539, the global trace-route message 402 is ignored and the input tunnel end-point 320 does not retransmit this global trace-route message 402 to the other LANs.

Otherwise, in a step 540, the input tunnel end-point 320 inserts a triplet of fields 415, 416 and 417. The field 415 corresponds to the TEP ID identifier 401 of the input tunnel end-point 320. The field 416 designating the input tunnel port of the input tunnel end-point 320 via which the global trace-route message 402 has reached the multi-TEP LAN 302, is filled with an input tunnel port number of the input tunnel end-point 320 which however, in the case of a multi-TEP LAN 302, has a global meaning in the multi-TEP LAN. However, in the case of a single-TEP LAN, the input tunnel port number of the tunnel end-point of the single-TEP LAN is a piece of data local to this tunnel end-point and not a value shared by other tunnel end-points.

Indeed, on the basis of the filtering table built during the tracing of the tunnel end-points on a same LAN, as described here above with reference to FIG. 5b, a unique numbering interval or slot for the tunnel ports is assigned to each tunnel end-point of the multi-TEP LAN 302.

This interval is obtained by taking, as most significant bits for this tunnel port identifier (or number) of a tunnel managed by a given tunnel end-point, the least significant bits of the local MAC address of the LAN port of this same tunnel end-point. The least significant bits of the tunnel port identifier (or number) are, for their part, sequentially incremented whenever a tunnel is created from this tunnel end-point (thus, there is no collision between the unique numbering intervals on the LAN).

Each tunnel end-point of a same multi-TEP LAN therefore knows the numbering intervals assigned to the other tunnel end-points by knowledge of the local MAC addresses of the other tunnel end-points.

In a step 540, for each tunnel (of the input tunnel end-point) that is different from the tunnel via which this global trace-route message 402 has arrived, the input tunnel end-point 320 retransmits a copy of the global trace-route message 402 after insertion, into the field 417 (step 540) of the identifier of the output port used by the input tunnel end-point 320 to retransmit this global trace-route message 402.

Then, in a step 541, the transmission of the global trace-route message 402 to the other tunnel end-points of the multi-TEP LAN 302 is done point to point between the input tunnel end-point 320 which has received the global trace-route message 402 and the other tunnel end-point of the multi-TEP LAN 302.

Thus, for each other tunnel end-point included in said multi-TEP LAN, distinct from said input tunnel end-point 320, the input tunnel end-point 320 sends a global trace-route message 402 modified by the insertion of the identifier "TEP ID" 401 of the input tunnel end-point 320 and by insertion of the input tunnel port identifier of the input tunnel end-point 320 via which the global trace-route message 402 has arrived.

FIG. 5e illustrates the reception of a global trace-route message 402 by another active tunnel end-point present on the multi-TEP LAN 302, called an output tunnel end-point 321, after processing and sending by the input tunnel end-point 320 via which this global trace-route message 402 has reached the multi-TEP LAN 302.

In a step 502, the output tunnel end-point 321 receives the global trace-route message 402 directly sent out by the input tunnel end-point 320 situated on the same multi-TEP LAN network 302. This input tunnel end-point 320 has a corresponding input in the filtering table (FIG. 5b) at the output tunnel end-point 321, and vice versa.

In a step 543, a comparison is made in order to check for the consistency of shared information between the tunnel end-points of the multi-TEP LAN 302. In this step, using the value of the field 415 of the global trace-route message 402 containing the TEP ID identifier 401 of the input tunnel end-point 320, a comparison is made with the data of the filtering table enables. This comparison enables verification that the number of the input tunnel port of the input tunnel end-point 320 is a number whose value is smaller than or equal to the value of the number of tunnels managed by this input tunnel end-point.

In a step 544, although the multi-TEP LAN 302 acts functionally as a single relay, the output tunnel end-point 321 increments the value of the relay counter in the relay counter field 414 of the relay activation message 402.

Indeed, a message traveling on a multi-TEP LAN 302 will make three passages on said multi-TEP LAN 302 between the internet gateway and the input tunnel end-point 320 and output tunnel end-point 321 as compared with two passages in the case of a single-TEP LAN. Thus, owing to this lengthier transit time, the relay counter field 414 of the global trace-route message 402 is incremented again by one unit.

In a step 545, the new value of the relay counter field 414 is then compared with the predetermined threshold value mentioned here above. If the value of the field 414 of this counter is greater than the value of the predetermined threshold then, in a step 546, the global trace-route message 402 is ignored and the output tunnel end-point does not retransmit it to the LANs to which it is connected by the tunnels that it manages, thus stopping the propagation of the global trace-route message 402 in the extended network.

If not, in a step 547, the global trace-route message 402 is updated. For each tunnel managed by said output tunnel end-point 321, the output tunnel end-point 321 modifies the global trace-route message 402 by the insertion, into the field 417 (inserted by the input tunnel end-point) of the global trace-route message 402, and an identifier of the output tunnel port of the output tunnel end-point 321 via which the modified global trace-route message 402 will be transmitted. Once modified, the global trace-route message 402 is transmitted on said other tunnel.

FIGS. 6a and 6b respectively illustrate the structure of the data-path-loop report 602 and the end-of-data-path report 603 send back to the manager tunnel end-point during the performance of the global trace-route method for tracing the community network. These two reports are carried in an Ethernet frame 260 already described with reference to FIGS. 2b and 2c. The fields are identical to those of the global trace-route message 402, namely a "unique tunnel end-point identifier" field 612 and a tunnel end-point port number field 613 respectively corresponding to the identifier and to the number of the input port of the last tunnel end-point encountered before said reports 602 and 603 are sent. These messages 602 and 603 also provide information on a series of triplets 615, 616 and 617 respectively corresponding to the identifier, the input port and the output port of each tunnel end-point encountered during the propagation of the global trace-route message 402 which is followed by the message 602 or 603. Only the relay counter field 614 differs in that the resetting at a value "FF" indicates an end-of-data-path report 603 and a resetting at a value "FE" indicates a data-path-loop report 602. It may be recalled that the relay counter field 614 is normally used to determine a case of propagation error or more generally an exceeding of the maximum number of relays allowed for a given path between a source LAN and a destination LAN. In this context, it is not used by the manager tunnel end-point for this purpose. It is then possible to initialize at predefined values to indicate specific messages such as end-of-data-path reports 603 or data-path-loop reports 602.

FIG. 7 illustrates the processing operations that take place in the manager tunnel end-point designated during the step 502 of FIG. 5a. After the global trace-route message 402 for the tracing of the potential relays of the community network has been sent, the manager tunnel end-point goes into waiting for the reception of the data-path-loop report 602 and end-of-data-path report 603.

In a step 700, the manager tunnel end-point receives a data-path-loop report 602 and an end-of-data-path report 603.

In a following step 701, the manager tunnel end-point updates a table of the data path loops and a table of the ends of data paths as and when said reports 602 and 603 are received. The duplication of a report is eliminated by a simple scanning of the tables during construction in order to insert a new entry.

This method of reception and processing 701 is repeated for a duration whose value is defined for example according to the size of the community. This duration is initialized in a timer whose time lag is verified during a step 702.

For example, according to the invention, for a set of LANs situated in a set of dwellings of a group of friends or belonging to a same family, a waiting value of 15 seconds appears to be appropriate (for the size of the community, namely the number of sites, is limited). It must be noted that during an updating of the global topology of the network detected at the step 501 of FIG. 5a, all the relays are initially inactive. They therefore cannot relay data messages.

In a step 703, a list is created. This is a list of the set of paths with possible communications relays between each possible pair of two LANs, one source LAN identified by a source tunnel end-point and one destination LAN identified by a destination tunnel end-point throughout the network of a community.

In the step 703, the end-of-path table is scanned by the creation of an entry in a list of tunnel of end-points. This list is arranged in a rising order of identifiers "TEP ID" 401 of tunnel end-points at each encounter, in an end-of-data-path report 603, a TEP ID identifier 401, a tunnel end-point that is not yet present in the end of data path table.

Then, the data path loop table is scanned similarly to create possible new entries in the list of the tunnel end-points.

In a following step 704, a table is created having each entry corresponding to one of the possible combinations of two tunnel end-points among the list of tunnel end-points. For each entry of this table, the table of the ends of the path is again scanned, in order to associate an indirect path with relays with each entry, combining the two tunnel end-points of this entry which correspond to a combination of a source tunnel end-point and a destination tunnel end-point.

For each entry, the shortest path is preserved. The number of entry and output ports indicated in the fields 616 and 617 of the reports 602 and 603 are also recorded in the end-of-path table.

A new extension of the filling of the combination table is possible by a scanning of the data-path-loop table, in keeping only the non-looping subsets of these paths, i.e. paths where there is no repetition of a same tunnel end-point in these looped paths.

In a step 705, by a reading of the table of combinations and an analysis of the path present in a field of an input, the list of the relays to be activated is inserted into a relay activation message 802 (described here below with reference to FIG. 8). Then, for a given path, the manager tunnel end-point sends the relay activation message 802 up to the first tunnel end-point encountered, calling for the activation of the relay function.

FIG. 8 shows the structure of a relay activation message 802 sent by the manager tunnel end-point. Classically, the payload part of the activation message 802 is conveyed in an Ethernet frame 260 as already described with reference to FIGS. 2b and 2c. This payload part comprises especially a series of three fields 415, 416 and 417 (also known as triplets) respectively corresponding to the identifier of the tunnel end-point whose relay function has to be activated, the input tunnel port of the relay activation message 802 and the output tunnel port of the relay activation message 802. These triplets 415, 416 and 417 of the relay activation message 802 are used to activate the relay function of each intermediate tunnel end-point situated on the selected path in order to route the relay activation message 802 to the tunnel end-points whose relay function is still to be activated for the selected path. A relay activation message 802 therefore comprises a list of all the relays to be activated for a given path. The payload part also comprises a "state" field 804 representing the state (whether active or not) of the relay function of each tunnel end-point crossed. The role of this field 804 is described in greater detail here below.

The manager tunnel end-point activates first of all the set of relay functions of the tunnel end-points situated at the ends of the possible paths between a couple formed by a source and destination LAN. This subsequently enables the manager tunnel end-point to propagate the relay activation message 802 via these activated end relay functions. Indeed, initially, even when the manager tunnel end-point is one of the ends of the path to be set up (by activation of the relay function), the manager tunnel end-point is unable to route messages solely via the tunnels set up directly between the manager tunnel end-point and other tunnel end-points (on paths without relays). In this first step, it will not be possible to route the relay activation message 802 to tunnel end-points that are not directly connected.

The manager tunnel end-point must also process cases where it is not one of the two ends of the path to be set up (where the manager tunnel end-point is neither the source tunnel end-point nor the destination tunnel end-point). In this case, either the manager tunnel end-point does not have a direct path (i.e. without a relay function) between itself and one of the ends or else it has not set up any indirect path (thanks to the relay function) between itself and any of the two ends of the path.

The manager tunnel end-point then, in this case, has no means of unicast routing of the relay activation message 802 designed to activate the relays of these paths.

The relay activation message 802, in order to await one of the path-end TEPs, is then sent out by the manager TEP for broadcasting on all the tunnels and also broadcast by each receiver TEP of this relay activation message 802 to all these tunnels except for the tunnel via which the relay activation message 802 has arrived. And this is done so long as the receiver TEP in single-TEP mode notes that it is no longer in the list of relay TEPs to be activated of the relay activation message 802. If not, the receiver TEP goes from the broadcast transmission mode to the unicast routing mode thanks to the routing information of each triplet of the relay activation message 802.

If the relay activation message 802 first reaches the first end tunnel end-point, the routing takes place normally to the output ports.

If the relay activation message 802 reaches the last end tunnel end-point, the routing is done via the input ports.

If the relay activation message 802 reaches one of the intermediate tunnel end-points whose relay function has to be activated, this relay activation message 802 is routed by convention towards the output port corresponding to the field 417 of the triplet corresponding to it, until all the state fields 804 are active (according to the mode described in the next paragraph). Then, when an end tunnel end-point receives a relay activation message 802 that has already traveled over a part of the path and if this end tunnel end-point detects the fact that not all the relays of the path have received this message as yet, then this end tunnel end-point will route this relay activation message 802 in the reverse sense to the other end.

Thus, the relay activation message 802 is routed from tunnel end-point to tunnel end-point like a check message directly intercepted by each tunnel end-point and then conveyed in point-to-point mode via a succession of tunnels each associated with a pair of remote tunnel end-points (not connected to a same LAN).

In the particular case of a multi-TEP LAN, according to the invention, the routing between the two tunnel end-points of a multi-TEP LAN network is possible thanks to the association made during the local trace-route method, between a tunnel port number having an overall significance at the multi-TEP LAN and a tunnel end-point of the same multi-TEP LAN, this tunnel port number enabling the identification of each tunnel end-point situated locally in a multi-TEP LAN.

An input tunnel end-point 320 situated on a multi-TEP LAN, which first receives the relay activation message 802 arriving from a tunnel, uses this association simply with its input tunnel port number. Indeed, the identifier TEP ID 401 used in the field 415 of the relay activation message 802 enables the unique identification of the multi-TEP LAN, and the input and output tunnel port number enables the unique identification, for this multi-TEP LAN, of the input tunnel end-point 320 which manages this input tunnel port and thus enables the routing of the relay activation message 802 to the output tunnel end-point 321 of the multi-TEP LAN.

Thus, if the relay activation message 802 reaches a multi-TEP LAN via the tunnel end-point which is not the one whose identifier TEP ID 401 had been used in the global trace-route message to mark the global trace-route message 402 during the crossing of a multi-TEP LAN, it is nevertheless possible to identify the input tunnel end-point from the local tunnel port number at the multi-TEP LAN considered, which is specific to a tunnel end-point, and thus correctly route the relay activation message 802 (i.e. the identifier TEP ID 401 of the input tunnel end-point on the LAN is used).

The field FD 803 of the payload part of the activation message 802 is used to identify a relay activation message sent out by the manager tunnel end-point. This manager tunnel end-point is identified in the relay activation message 802 by the manager tunnel end-point identifier field 805 and the manager tunnel end-point port field 806 corresponding to the port via which the relay activation message 802 is sent. The state field 804 is updated by a tunnel end-point forming part of the tunnel end-points that are situated on the selected path, and whose relay function has to be activated. It is used to indicate whether the activation of the relay function has been successful. For example, the value "0" indicates that the relay activation message 802 has not yet been received by the designated tunnel end-point, the value "1" indicates a successful activation of the function and the value "2" indicates a failure of the activation of the relay function. These pieces of information enable the manager tunnel end-point, in the event of a failure in the activation of a relay function, either to select another tunnel end-point to set up the path being set up or to deactivate the relay functions of the same path which would have been activated unnecessarily.

FIG. 9 shows the processing operations performed by a tunnel end-point upon reception of a relay activation message 802 conveyed in an Ethernet frame 260.

The routing part has been described in the above paragraph and only the processing of activation of the relay function shall be described here.

In a step 900, a tunnel end-point receives a relay activation message 802. This message 802 contains a list of quadruplets of fields 804, 415, 416, 417 (described here above) for each relay to be activated for a given path between a source LAN and a destination LAN.

In the relay activation message 802 the tunnel end-point makes a check to see whether it is in the list of tunnel end-points whose relay function needs to be activated and, depending on the value of the state field 804, whether the operation has not already been performed on this tunnel end-point.

If the operation has not already been performed on this tunnel end-point then, in a following step 901, the tunnel end-point makes a check to see whether, following the local trace-route method (of FIG. 5b) it is situated in a single-TEP LAN or a multi-TEP LAN.

If the tunnel end-point is situated in a single TEP LAN then, in a step 903, the tunnel end-point positions a table of local variables with one entry for each combination of two tunnel ports managed by this tunnel end-point to authorize the relaying of data frames coming from an input tunnel port 416 to an output tunnel port 417. This variable prompts the relaying, at the reception of a data frame for one of the identified input tunnel ports, of this data frame to another output tunnel port associated with this entry.

A following step 905 (described further below in this section) then enables the updating of this state field 804 of the relay activation message 802.

If the tunnel end-point, which is then called the input tunnel end-point 320, is situated in a multi-TEP LAN, it must be noted that the relay activation message 802 for the activation of the relay function by a set of tunnel end-points situated on a multi-TEP LAN will be generated only once to this multi-TEP LAN and this will be done with the use of the field 415 containing the TEP ID identifier 401 of the input tunnel end-point 320 via which the global trace-route message 802 has entered this multi-TEP LAN.

This TEP ID identifier 401 of the input tunnel end-point is the one present in the triplet 415, 416, 417 of the end-of-data-path report 603 and the data-path-loop report 602 sent to the manager tunnel end-point. This is the unique identification by which the manager tunnel end-point knows the relay implemented by the tunnel end-points of this multi-TEP LAN.

Thus, if the input tunnel end-point 320 is situated in a multi-TEP LAN, in a step 902 this input tunnel end-point 320 will determine another tunnel end-point, called an output tunnel end-point 321, to which the input tunnel end-point 320 will retransmit the relay activation message on the multi-TEP LAN. It must be noted that the retransmission of the relay activation message 802 is done directly in an IP packet conveyed by an Ethernet frame without tunneling encapsulation.

According to this invention, this determining of the output tunnel end-point 321 is made possible by the general notion of the tunnel port identifier defined here above for the multi-TEP LANs. Indeed, the input tunnel end-point 320 can know the identifier TEP ID 401 of the output tunnel end-point 321 from the identifier of the output tunnel port of this output tunnel end-point 321. This tunnel port identifier, or local number at the LAN considered, is contained in the field 417 of the quadruplet (804, 415, 416, 417) which corresponds to the input tunnel end-point 320 in the list of the relays of the relay activation message 802. The least significant bits of the identifier represent the local tunnel number on a tunnel end-point and the most significant bits represent the index of the local tunnel end-point driving this tunnel. The input tunnel end-point thus recovers the identifier TEP ID 401 and hence the IP and local MAC addresses of the output tunnel end-point from the indices in the table of the local tunnel end-points described earlier with reference to FIG. 5b.

The input tunnel end-point 320 then activates the relay function for a stream coming from the output tunnel end-point 321 by the elimination, from its filtering table for the recording of the output tunnel end-point 321, of the field that contains the virtual MAC address associated with the tunnel port to be activated in the output tunnel end-point 321. This is the virtual MAC address that is used for this tunnel port by the output tunnel end-point 321, for the source MAC address substitution in the frames sent out by the remote terminals and received by this tunnel. This elimination corresponds to the stopping of the filtering of the frame streams received by the output tunnel end-point 321 from its tunnel involved in the relay considered, and then transmitted on the multi-TEP LAN by the output tunnel end-point 321 which, by filtering on the source MAC address, is not relayed by the input tunnel end-point 320.

Then, in a step 904, the output tunnel end-point 321 receives this relay activation message 802 retransmitted by the input tunnel end-point 320 via the multi-TEP LAN. The output tunnel end-point 321 then ascertains that the field 416 of the quadruplet, whose field 415 corresponds to the input tunnel end-point 320, effectively corresponds to an input tunnel port on said input tunnel end-point 320. Then, in its filtering table, for the recording corresponding to the input tunnel end-point 320, the output tunnel end-point 321 eliminates the field containing the virtual MAC address associated with the tunnel port to be activated in the input tunnel end-point 320. This is the virtual MAC address used for this tunnel port by the input tunnel end-point 320 for the source MAC address substitution in the frames sent out by the remote terminals. This elimination corresponds to the stopping of the filtering of the frame streams which are received by the input tunnel end-point 320 from its tunnel involved in the relay considered and then transmitted on the multi-TEP LAN by the input tunnel end-point 320 and which, by source MAC address filtering, are not relayed by the output tunnel end-point 321.

Indeed, a frame 260 arriving via a tunnel on the multi-TEP LAN is first of all received by an Internet gateway such as 311, 322, 324, 333, 341 and 351 and then transmitted on the multi-TEP LAN to the tunnel end-point which manages the corresponding tunnel. This frame is then transmitted on the multi-TEP LAN after removal of the encapsulation elements of the frame 260 and after substitution by the tunnel end-point of the source MAC address field in the frame initially sent out by the remote terminal, by a virtual MAC address. This virtual MAC address is associated by the tunnel end-point with a tunnel port which corresponds to the tunnel port via which the frame 260 has reached the multi-TEP LAN. Thus, the tunnel end-points of a multi-TEP LAN can control the activation and deactivation of the relay function on a multi-TEP LAN thanks to a filtering table applied to the source MAC address of the packets in transit on the multi-TEP LAN.

It must be noted that initially, after execution of the local trace-route method presented in the description of FIG. 5b, the data frame relay function for each tunnel end-point is deactivated. To this end, each tunnel end-point places the virtual MAC address of each of the tunnels managed by the other tunnel end-points of the multi-TEP LAN in this virtual MAC address filtering table, thus deactivating the relay function of the multi-TEP LAN for all the tunnels managed by all the local TEPs in this multi-TEP LAN.

In a step 905, the tunnel end-point (output tunnel end-point 321 for a multi-TEP LAN or single tunnel end-point for a single TEP LAN) checks to see whether the end of the path described in the relay activation message 802 has been reached.

If this is so then, in a step 802, the processing of the relay activation message 802 comes to an end.

In a particular embodiment of the invention, a report on success of activation of the relays for the data path described in the relay activation message 802 is transmitted by the tunnel end-point (output tunnel end-point 321 for a multi-TEP LAN or single tunnel end-point for a single-TEP LAN) addressed to the manager tunnel end-point that has sent the relay activation message 802. This report can take up the quadruplet (804, 415, 416, 417) updated by the different relays along the data path to be activated, once the "state" field 804 has been updated by the tunnel end-point for the relay that concerns it.

If the end of the path described in the relay activation message 802 is not reached then, in a step 906, the tunnel end-point (output tunnel end-point 321 for a multi-TEP LAN or single tunnel end-point for a single-TEP LAN) updates the state field 804 to indicate the success (or failure) of the activation of the relay function that has to be performed on a single TEP LAN or a multi-TEP LAN for a given path.

Finally, the tunnel end-point (output tunnel end-point 321 for a multi-TEP LAN or single tunnel end-point for a single-TEP LAN) retransmits the relay activation message 802 to the next LAN by means of the output tunnel port involved in the relay function that has just been activated.

FIG. 10 illustrates an implementation of a generic tunnel end-point 1000 of the same type as the tunnel end-points 310, 320, 321, 330, 331, 340, 350 described in FIG. 3. Each tunnel end-point is adapted to implementing the method according to a particular embodiment of the invention.

This generic device 1000 may be connected in particular to any means of storage of images, videos or sound delivering multimedia information to the generic tunnel end-point 1000.

Thus, the generic tunnel end-point 1000 has a communications bus 1002 to which the following are connected:
- a central processing unit 1003 (for example a microprocessor referenced CPU);
- a read-only memory 1004 referenced ROM;
- a random-access memory 1006 (cache memory referenced RAM) working like a main memory, a work zone etc. of a central processing unit 1003. The capacity of the RAM 1006 can be extended by an optional RAM connected to an extension port (not shown);
- a keyboard 1010, a mouse 1011 and a screen 1008 enabling a user to interact with this implementation 1000;
- a communications interface 1018 connected to a distributed communications network 1020, for example a network such as the LAN 303 of FIG. 3, the interface being capable of transmitting and receiving data.

The generic tunnel end-point 1000 also has a hard-disk drive 1012 and a floppy drive 1014.

The communications bus 1002 enables communications and interoperability between the different devices included in the generic tunnel end-point 1000 or connected to this device.

More generally, via the communications bus 1002, the central processing unit 1003 can communicate instructions to any device included in the generic tunnel end-point 1000 directly or by means of another device of the generic tunnel end-point.

The central processing unit 1003 is capable of executing instructions from the program ROM 1004 when the communications equipment is powered on, After the power is turned on, the central processing unit 1003 is capable of executing instructions from the main memory 1006 related to a software application after these instructions have been loaded, for example from the program ROM 1004, the hard disk drive 1012, the read-only memory 1004 or the floppy drive 1014 associated with a floppy 1016.

A software application such as this, when executed by the central processing unit 1003, prompts the execution of all or part of the steps of the flowcharts illustrated here above in FIGS. 5*a*, 5*b*, 5*c*, 5*d*, 5*e*, 7, 9.

It must be noted that the steps of the FIGS. 5*a*, 5*b*, 5*c*, 5*d*, 5*e*, 7, 9, including the different alternative embodiments, can all be done in the form of computer programs. However, for reasons of performance, it may be advantageous for certain functions to be carried out by a piece of dedicated hardware.

The invention claimed is:

1. A method for setting up a communications path between a first communications sub-network and a second communications sub-network by means of an intermediate sub-network, in an extended communications network, said extended communications network comprising a plurality of sub-networks, each sub-network comprising at least one tunnel end-point to enable the interconnection of said sub-network with at least one other sub-network of said plurality of sub-networks by means of at least one communications tunnel, wherein said intermediate sub-network comprises at least two tunnel end-points and in that an input tunnel end-point of said intermediate sub-network performs the following steps:
   receiving, from a tunnel of said input tunnel end-point, a relay activation message to set up said path, said message referring to a local relay involving said input tunnel end-point;
   determining, from said relay activation message, an output tunnel end-point of said intermediate sub-network involved in the local relay;
   activating the local relay for a part of said path between said first sub-network and said second sub-network, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point; and
   transmitting the relay activation message to said output tunnel end-point,
   wherein said relay activating step includes a step of stopping a filtering of the data frames coming from said second sub-network by elimination of an address associated with said output tunnel end-point in a frame filtering table of the input tunnel end-point, and
   wherein said filtering is performed on a source address field of said data frames, said field corresponding to a virtual address which is allocated by the tunnel end-point of said intermediate network having received said data frames and which represents the tunnel via which said frames have been received.

2. The method according to claim 1, wherein said determining step is performed on the basis of a relay descriptor, contained in the relay activation message, said descriptor comprising a tunnel identifier associated with said local relay and in correspondence with the input tunnel end-point, said tunnel identifier identifying a tunnel distinct from the tunnel or tunnels of said input tunnel end-point.

3. The method according to one of the claims 1 and 2, further comprising the following steps:
   receiving a global trace-route message for tracing communication paths within said extended communications network;
   adding a relay descriptor referring to the input tunnel end-point to the global trace-route message to modify the global trace route message; and
   transmitting the modified global trace-route message to at least one other tunnel end-point of said intermediate sub-network.

4. The method according to claim 3, wherein the relay descriptor further comprises an identifier of the tunnel of the input tunnel end-point via which the global trace-route message has been received by said input tunnel end-point.

5. The method according to claim 1, wherein the step of activating the local relay performed by the input tunnel endpoint enables the path to be set up for communications in the direction going from the second sub-network to the first sub-network.

6. A method for setting up a communications path between a first communications sub-network and second communications sub-network by means of an intermediate sub-network, in an extended communications network, said extended communications network comprising a plurality of sub-networks, each sub-network comprising at least one tunnel end-point for the interconnection of said sub-network to at least one other sub-network of said plurality of sub-networks by means of at least one communications tunnel, wherein said intermediate sub-network comprises at least two tunnel end-points, and an output tunnel endpoint of said tunnel end-points of said intermediate sub-network performs the following steps:

receiving, from an input tunnel end-point of said intermediate sub-network, a relay activation message for setting up said path, said message referring to a local relay involving said input tunnel end-point and said output tunnel end-point; and activating the local relay for a second part of said path between said first sub-network and said second sub-network, complementary to a first part of said path for which said local relay has been activated by said input tunnel end-point, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point, wherein said relay activating step includes a step of stopping a filtering of the data frames coming from said first sub-network by elimination of an address associated with said input tunnel end-point in a frame filtering table of the output tunnel end-point, and wherein said filtering is performed on a source address field of said data frames, said field corresponding to a virtual address which is allocated by the tunnel end-point of said intermediate network having received said data frames and which represents the tunnel via which said frames have been received.

7. The method according to claim 6, further comprising a step of verifying the presence, in the relay activation message, of a tunnel identifier associated with said local relay and in correspondence with an identifier of said input tunnel end-point, said tunnel identifier identifying a tunnel of said output tunnel end-point.

8. The method according to claim 6, further comprising the following steps of:

receiving, from said input tunnel end-point, a global trace-route message for tracing communications paths within said extended communications network;

modifying a relay descriptor of the global trace-route message, said descriptor referring to the input tunnel end-point, said modification consisting in setting up a correspondence between an identifier of an output tunnel of said output tunnel end-point with the input tunnel end-point; and transmitting the global trace-route message modified via said output tunnel.

9. The method according to claim 6, wherein the step of activating the local relay performed by the output tunnel end-point enables the path to be set up for a communication in the direction going from the first sub-network to the second sub-network.

10. A non-transitory computer-readable storage medium, storing a computer program comprising a set of instructions that can be executed by said computer in order to implement a method for setting up a communications path between a first communications sub-network and a second communications sub-network by means of an intermediate sub-network, in an extended communications network, said extended communications network comprising a plurality of sub-networks, each sub-network having at least one tunnel end-point to enable the interconnection of said sub-network with at least one other sub-network of said plurality of sub-networks by means of at least one communications tunnel, wherein said intermediate sub-network comprises at least two tunnel end-points and wherein said set of instructions performs the following steps when it is executed by an input tunnel end point of said intermediate sub network:

receiving, from a tunnel of said input tunnel end-point, a relay activation message to set up said path, said message referring to a local relay involving said input tunnel end-point;

determining, from said relay activation message, an output tunnel end-point of said intermediate sub-network involved in the local relay;

activating the local relay for a part of said path between said first sub-network and said second sub-network, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point; and transmitting the relay activation message to said output tunnel end-point, wherein said relay activating step includes a step of stopping a filtering of the data frames coming from said second sub-network by elimination of an address associated with said output tunnel end-point in a frame filtering table of the input tunnel end-point, and wherein said filtering is performed on a source address field of said data frames, said field corresponding to a virtual address which is allocated by the tunnel end-point of said intermediate network having received said data frames and which represents the tunnel via which said frames have been received.

11. A non-transitory computer-readable storage medium, storing a computer program comprising a set of instructions that can be executed by said computer in order to implement a method for setting up a communications path between a first communications sub-network and a second communications sub-network by means of an intermediate sub-network, in an extended communications network, said extended communications network comprising a plurality of sub-networks, each sub-network having at least one tunnel end-point to enable the interconnection of said sub-network with at least one other sub-network of said plurality of sub-networks by means of at least one communications tunnel, wherein said intermediate sub-network comprises at least two tunnel end-points and wherein said set of instructions performs the following steps when it is executed by an output tunnel end point of said intermediate sub network:

receiving, from an input tunnel end-point of said intermediate sub-network, a relay activation message for setting up said path, said message referring to a local relay involving said input tunnel end-point and said output tunnel end-point; and activating the local relay for a second part of said path between said first sub-network and said second sub-network, complementary to a first part of said path for which said local relay has been activated by said input tunnel end-point, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point, wherein said relay activating step includes a step of stopping a filtering of the data frames coming from said first sub-network by elimination of an address associated with said input tunnel end-point in a frame filtering table of the output tunnel end-point, and wherein said filtering is performed on a source address field of said data frames, said field corresponding to a virtual address which is allocated by the tunnel end-point of said intermediate network having received said data frames and which represents the tunnel via which said frames have been received.

12. An input tunnel end-point of an intermediate sub-network, wherein a communications path is set up in an extended communications network between a first communications sub-network and a second communications sub-network by means of said intermediate sub-network, said extended communications network comprising a plurality of sub-networks, each sub-network having at least one tunnel end-point to enable the interconnection of said sub-network with at least one other sub-network of said plurality of sub-networks by means of at least one communications tunnel, wherein said intermediate sub-network comprises at least two tunnel end-points and wherein the input tunnel end-point comprises:

means for receiving, from a tunnel of said input tunnel end-point, a relay activation message to set up said path, said message referring to a local relay involving said input tunnel end-point;

means for determining, from said relay activation message, an output tunnel end-point of said intermediate sub-network involved in the local relay;

means for activating the local relay for a part of said path between said first sub-network and said second sub-network, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point; and means for transmitting the relay activation message to said output tunnel end-point, wherein said relay activating means includes means for stopping a filtering of the data frames coming from said second sub-network by elimination of an address associated with said output tunnel end-point in a frame filtering table of the input tunnel end-point, and wherein said filtering is performed on a source address field of said data frames, said field corresponding to a virtual address which is allocated by the tunnel end-point of said intermediate network having received said data frames and which represents the tunnel via which said frames have been received.

13. The input tunnel end-point according to claim 12, wherein the means for determining an output tunnel end-point comprise a relay descriptor, contained in the relay activation message, said relay descriptor comprising a tunnel identifier associated with said local relay and in correspondence with the input tunnel end-point, said tunnel identifier identifying a tunnel distinct from the tunnel or tunnels of said input tunnel end-point.

14. An output tunnel end-point of an intermediate sub-network, wherein a communications path is set up in an extended communications network between a first communications sub-network and a second communications sub-network by means of said intermediate sub-network, said extended communications network comprising a plurality of sub-networks, each sub-network comprising at least one tunnel end-point to enable the interconnection of said sub-network with at least one other sub-network of said plurality of sub-networks by means of at least one communications tunnel, wherein said intermediate sub-network comprises at least two tunnel end-points, and in that an output tunnel end-point of said tunnel end-points of said intermediate sub-network comprises:

means for receiving, from an input tunnel end-point of said intermediate sub-network, a relay activation message for setting up said path, said message referring to a local relay involving said input tunnel end-point and said output tunnel end-point; and means for activating the local relay for a second part of said path between said first sub-network and said second sub-network, complementary to a first part of said path for which said local relay has been activated by said input tunnel end-point, which enables setting up of the communications path for communications from the second sub-network to the first sub-network while selectively blocking communications relayed on the intermediate sub-network by an output tunnel end-point to the first sub-network by activation or deactivation of a relay function of the input tunnel end-point, wherein said relay activating means includes means for stopping a filtering of the data frames coming from said first sub-network by elimination of an address associated with said input tunnel end-point in a frame filtering table of the output tunnel end-point, and wherein said filtering is performed on a source address field of said data frames, said field corresponding to a virtual address which is allocated by the tunnel end-point of said intermediate network having received said data frames and which represents the tunnel via which said frames have been received.

15. The output tunnel end-point according to claim 14, further comprising means for verifying the presence in the relay activation message of a tunnel identifier associated with said local relay and in correspondence with an identifier of said input tunnel end-point, said tunnel identifier identifying a tunnel of said output tunnel end-point.

16. The output tunnel end-point according to claim 15, further comprising:

means for receiving, from said input tunnel end-point, a global trace-route message for tracing communications paths within said extended communications network;

means for modifying a relay descriptor of the global trace-route message, said descriptor referring to the input tunnel end-point, said modification consisting in setting up a correspondence between an identifier of an output tunnel of said output tunnel end-point with the input tunnel end-point; and means for transmitting the global trace-route message modified via said output tunnel.

* * * * *